United States Patent
Balasubramanian et al.

(10) Patent No.: US 10,846,153 B2
(45) Date of Patent: *Nov. 24, 2020

(54) BOT CREATION WITH WORKFLOW DEVELOPMENT SYSTEM

(71) Applicant: Microsoft Technology Licensing, LLC, Redmond, WA (US)

(72) Inventors: Barath Balasubramanian, Bothell, WA (US); Ashwin Sathya Raghunathan, Bellevue, WA (US); Jade D. Naaman, Bothell, WA (US); Daniel J. Kappes, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,138

(22) Filed: Jul. 13, 2018

(65) Prior Publication Data

US 2018/0321922 A1 Nov. 8, 2018

Related U.S. Application Data

(63) Continuation of application No. 15/482,377, filed on Apr. 7, 2017, now Pat. No. 10,025,567.

(Continued)

(51) Int. Cl.
*G06F 9/44* (2018.01)
*G06F 9/54* (2006.01)
(Continued)

(52) U.S. Cl.
CPC ............... *G06F 9/546* (2013.01); *G06F 8/34* (2013.01); *G06F 8/38* (2013.01); *H04L 51/02* (2013.01)

(58) Field of Classification Search
CPC ... G06F 8/34; G06F 8/38; G06F 9/546; H04L 51/02
(Continued)

(56) References Cited

U.S. PATENT DOCUMENTS

| 10,025,567 B2 * | 7/2018 | Balasubramanian ... H04L 51/02 |
| 2002/0038217 A1 * | 3/2002 | Young .............. G06Q 10/06311 705/7.15 |

(Continued)

OTHER PUBLICATIONS

Leon Welicki, "Workflow Services—Visual Design of Workflows with WCF and WF 4", May 2010, retrieved from https://msdn.microsoft.com/en-us/magazine/mt149362?author=leon+welicki, 18 pages. (Year: 2010).*

(Continued)

*Primary Examiner* — Ted T. Vo
(74) *Attorney, Agent, or Firm* — Fiala & Weaver P.L.L.C.

(57) ABSTRACT

A workflow development system is described that enables users to easily develop and deploy bots. The system provides a graphical user interface (GUI) that enables a user to select a plurality of steps for inclusion in a workflow and within which each user-selected step is represented as an interactive object. The plurality of steps includes at least one step of receiving a message directed to a bot or sending a message on behalf of the bot and at least one step of invoking an application to perform an action in response to receiving the message directed to the bot or to receive information upon which the sending of the message on behalf of the bot will be based. The system also receives information about each of the user-selected steps included in the workflow and generates workflow logic based on the received information that is executable to run the workflow.

20 Claims, 15 Drawing Sheets

Related U.S. Application Data

(60) Provisional application No. 62/408,550, filed on Oct. 14, 2016.

(51) Int. Cl.
*H04L 12/58* (2006.01)
*G06F 8/34* (2018.01)
*G06F 8/38* (2018.01)

(58) Field of Classification Search
USPC .................................. 717/104–116
See application file for complete search history.

(56) References Cited

U.S. PATENT DOCUMENTS

2010/0332404 A1\* 12/2010 Valin .................. G06Q 30/0239
    705/310
2018/0075335 A1\* 3/2018 Braz ................. G06F 16/24522

OTHER PUBLICATIONS

Claire Karjalainen, "How to Add Bots to Your Workflows the Proper (Read: Productive) Way", Aug. 2016, retrieved from https://blog.trello.com , 8 pages. (Year: 2016).\*

\* cited by examiner

BOT CREATION WITH WORKFLOW DEVELOPMENT SYSTEM

CROSS-REFERENCE TO RELATED APPLICATIONS

This application is a continuation of U.S. application Ser. No. 15/482,377, filed Apr. 7, 2017, entitled "Bot Creation with Workflow Development System," which claims the benefit of U.S. Provisional Patent Application No. 62/408,550, entitled "Bot Creation with Automated Workflow Development System" and filed on Oct. 14, 2016, the entireties of which are hereby incorporated by reference herein.

BACKGROUND

A "chat bot" or "bot" is an artificially intelligent software program that uses natural language processing to simulate intelligent conversation with end users via auditory or textual methods. "Bots" can have conversations with people (e.g., customers of a business) via various communication channels and automate tasks such as hotel booking or order delivery. Bots can help people order food, shop for clothes, save money and find restaurants. For example, a bot can help a person manage her money by showing her bank balance and upcoming bills. As another example, a bot can inform a person about the weather around her. Many bots are programmed to act like humans so that when a person interacts with them it feels like asking another person for help.

Today, developing a bot is not a simple task. Rather, developing a bot is typically a complex task that requires the skills of one or more seasoned software developers. These developers must understand both the programming language needed to code the bot (e.g., C #, Java, or the like) as well as the various communication protocols that may be used by the bot to communicate over one or more communication channels. Furthermore, even after a bot is developed, there are other issues and challenges associated with running the bot including but not limited to debugging and testing the bot, hosting the bot, maintaining the bot, implementing security for the bot, and the like.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for implementing a workflow development system that enables users with little or no programming experience to develop and deploy bots that are capable of communicating with end users over one or more communication channels and which can invoke other applications to perform actions based on messages received from end users and to obtain information from such other applications which can then be used as the basis for subsequent interactions with end users. The workflow development system also makes it easier to debug and test the bot, host the bot, maintain the bot, implement security for the bot, and the like.

In embodiments, the workflow development system provides a workflow designer graphical user interface (GUI) via which a user is enabled to select a plurality of workflow steps for inclusion in a workflow and within which each user-selected workflow step is represented as an interactive object. The plurality of workflow steps includes at least one workflow step of receiving a message directed to a bot or sending a message on behalf of the bot and at least one workflow step of invoking an application to perform an action in response to receiving the message directed to the bot or to receive information upon which the sending of the message on behalf of the bot will be based. The workflow development system also receives constructed workflow information that indicates each of the user-selected workflow steps included in the workflow, any input parameter values associated therewith, and a sequencing thereof and generates workflow logic based on the received constructed workflow information, the workflow logic being executable in a runtime environment to run the workflow.

In further embodiments, the workflow development system presents in the workflow designer GUI a graphical representation of a first workflow step, the first workflow step including receiving a message directed to a bot, and a graphical representation of a second workflow step, the graphical representation of the second workflow step comprising a data entry element into which a value of an input parameter of the second workflow step can be input. The workflow development system also presents in the workflow designer GUI one or more user-interactive objects that respectively represent one or more items of information associated with the message received as part of the first workflow step. In response to user interaction with a particular user-interactive object among the one or more user-interactive objects, the workflow development system copies the particular user-interactive object into the data entry element. The workflow development system further generates executable workflow logic corresponding to at least the first workflow step and the second workflow step, the generating the executable workflow logic comprising defining the value of the input parameter of the second workflow step to include a value of the particular item of information that corresponds to the particular user-interactive object that was copied into the data entry element.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
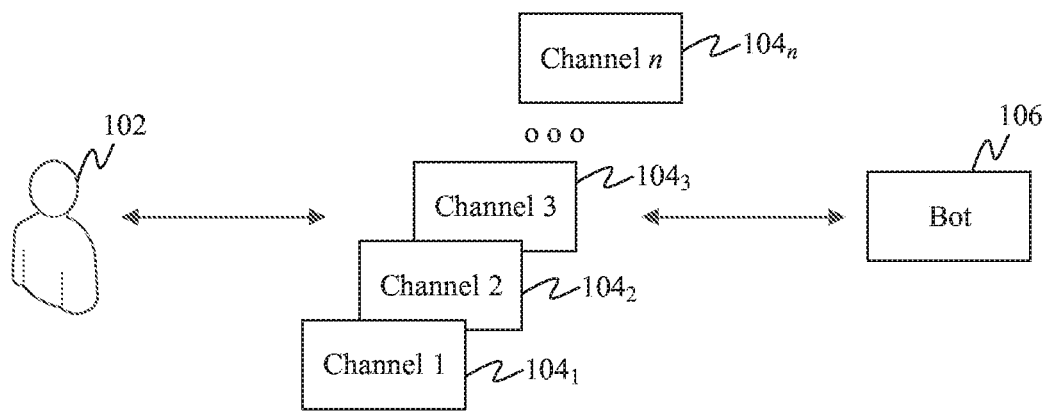
FIG. 1 is a block diagram of an example system for executing bots in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below will describe example embodiments for creating bots using a workflow development system. Section III below will describe an example mobile device and an example processor-based computer system that may be used to implement features of the embodiments described herein. Section IV below will describe some additional example embodiments. Section V will provide some concluding remarks.

II. Example Embodiments for Bot Creation Using a Workflow Development System

FIG. 1 is a block diagram of an example system 100 for executing bots in accordance with an embodiment. As shown in FIG. 1, in system 100, an end user 102 may communicate with a bot 106 (executing software agent) over a variety of different communication channels $104_1$, $104_2$, $104_3$, . . . , $104_n$. For example, end user 102 may communicate with bot 106 over SMS, email, Skype®, Skype for Business®, Slack®, or the like. Bot 106 may be executing on a server or other computing device or platform.

In the scenario of FIG. 1, a party interested in deploying bot 106 must first develop it (i.e., code it). Conventionally, developing a bot is not a simple task. Rather, developing a bot is typically a complex task that requires the skills of one or more seasoned software developers. These developers must understand both the programming language needed to code the bot (e.g., C #, Java, or the like) as well as the various communication protocols that must be used by the bot to communicate over the various communication channels (e.g., SMS, e-mail, Skype®, Skype for Business®, Slack®, or the like). Furthermore, even after a bot is developed, there are other issues and challenges associated with running the bot including but not limited to debugging and testing the bot, hosting the bot, maintaining the bot, implementing security for the bot, and the like.

Figure 2:
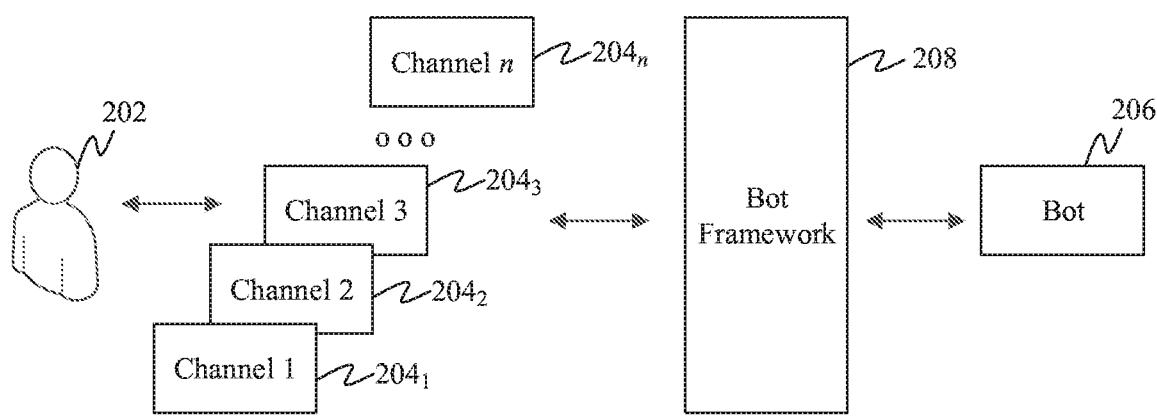
FIG. 2 is a block diagram of another example system for executing bots in accordance with an embodiment.

FIG. 2 is a block diagram of an example system 200 for executing bots in accordance with another embodiment. In system 200, a bot framework 208 is used to partially simplify the bot development, deployment and management process. One non-limiting example of bot framework 208 is Microsoft® Bot Framework, published by Microsoft Corporation of Redmond, Wash. Bot framework 208 may include, for example, a Bot Builder Software Development Kit (SDK), a Developer Portal, and a Bot Directory.

The Bot Builder SDK may comprise an open source SDK hosted on a web-based repository that provides developers with tools and components that are helpful in building bots, including Node.js-, .NET- or REST API-based bots. Such tools and components may comprise, for example, reusable dialogs, support for rich interactions, an online/offline chat emulator or the like.

The Developer Portal may comprise, for example, one or more tools or services that enable a developer to connect her bot(s) seamlessly to any of a variety of communication channels or services. In one embodiment, a developer can simply register her bot, configure desired channels, and publish the bot in the Bot Directory. In some embodiments, all bots registered with the bot framework in this manner are auto-configured to work with Skype® and the Web. In the context of example system 200 of FIG. 2, a developer registers her bot 206 with bot framework 208 and bot framework 208 enables bot 206 to communicate with one or more end users (e.g., end user 202) over a plurality of different communication channels 204$_1$, 204$_2$, 204$_3$, ..., 204$_n$ with little or no additional configuration by the developer required.

The Bot Directory may comprise a public directory of all reviewed bots registered through the Developer Portal. Users may be enabled to discover, try, and add bots to their favorite conversation experiences from the Bot Directory.

In system 200 of FIG. 2, certain aspects of deploying and managing bot 206 are simplified. For example, bot framework 208 makes it easier for a developer to connect bot 206 with different communication channels 204$_1$, 204$_2$, 204$_3$, ..., 204$_n$. However, even in system 200 of FIG. 2, bot 206 itself must be coded using a conventional computer programming language. Consequently, the skills of one or more experienced software developers may still be required to create the bot.

In an embodiment, the creation of a bot is greatly simplified by using a workflow development system to create the bot. The workflow development system includes a graphical user interface (GUI) that makes it easy for a user thereof to selectively add predefined steps to a workflow under development, and to configure those steps to operate in a desired manner. In this way, even users who are not skilled at developing software or working with computer programming languages can develop a bot. For example, a modified version of a workflow development system such as that described in the following commonly-owned and co-pending U.S. Patent Applications may be used to create the bot: U.S. patent application Ser. No. 15/188,407 filed on Jun. 21, 2016 (entitled "Workflow Development System with Ease-of-Use Features"), U.S. patent application Ser. No. 15/232,575 filed on Aug. 9, 2016 (entitled "Workflow Development System with Ease of Use Features"), U.S. patent application Ser. No. 15/274,935 filed on Sep. 23, 2016 (entitled "Intelligent Flow Designer"), and U.S. patent application Ser. No. 15/358,752 filed on Nov. 22, 2016 (entitled "Debugging a Flow"). The entirety of each of these applications is incorporated by reference herein.

In accordance with an embodiment, a user can utilize the workflow development system to build a bot, such that a completed workflow comprises the bot logic. The user is enabled to build the bot as a series of connected steps (e.g., triggers and actions) that can be retrieved on behalf of the user by the workflow development system and graphically represented within the GUI thereof. Once the steps are included within the workflow under development, the user may configure various parameters (e.g. input parameters) of each workflow step and then save the workflow for subsequent execution.

As will be described in further detail herein, a set of predefined steps relating to bot interactions (e.g., "when a bot receives a message," "send to conversation," "wait for a response") are made available to the user for inclusion in the workflow. These steps can be used to implement a script for managing interaction between the bot and an end user. These steps can also be combined with other workflow steps that are designed to interact with other applications (e.g., email applications, document management applications, database applications, social networking applications, financial services applications, news applications, search applications, productivity applications, cloud storage applications, file hosting applications, etc.) so that such other applications can be invoked to perform actions in response to certain interactions between the bot and an end user and also to obtain information that can be used to facilitate such interactions.

In one embodiment, the user is enabled to set up a connection between the bot (implemented as a workflow) and a bot framework (e.g., Microsoft® Bot Framework) so that the bot framework can send and receive messages on behalf of the bot over one or more communication channels, thereby further simplifying the deployment of the bot.

Further details concerning example embodiments of a workflow development system that may be used to create a bot will be described in Section A, below. Section B will describe an example GUI of the workflow development system that may be used to create a bot as well as example predefined workflow steps that may be used to create such a bot. Section C will describe example methods of creating a bot using a workflow development system.

A. Example Workflow Development System Embodiments

Figure 3:
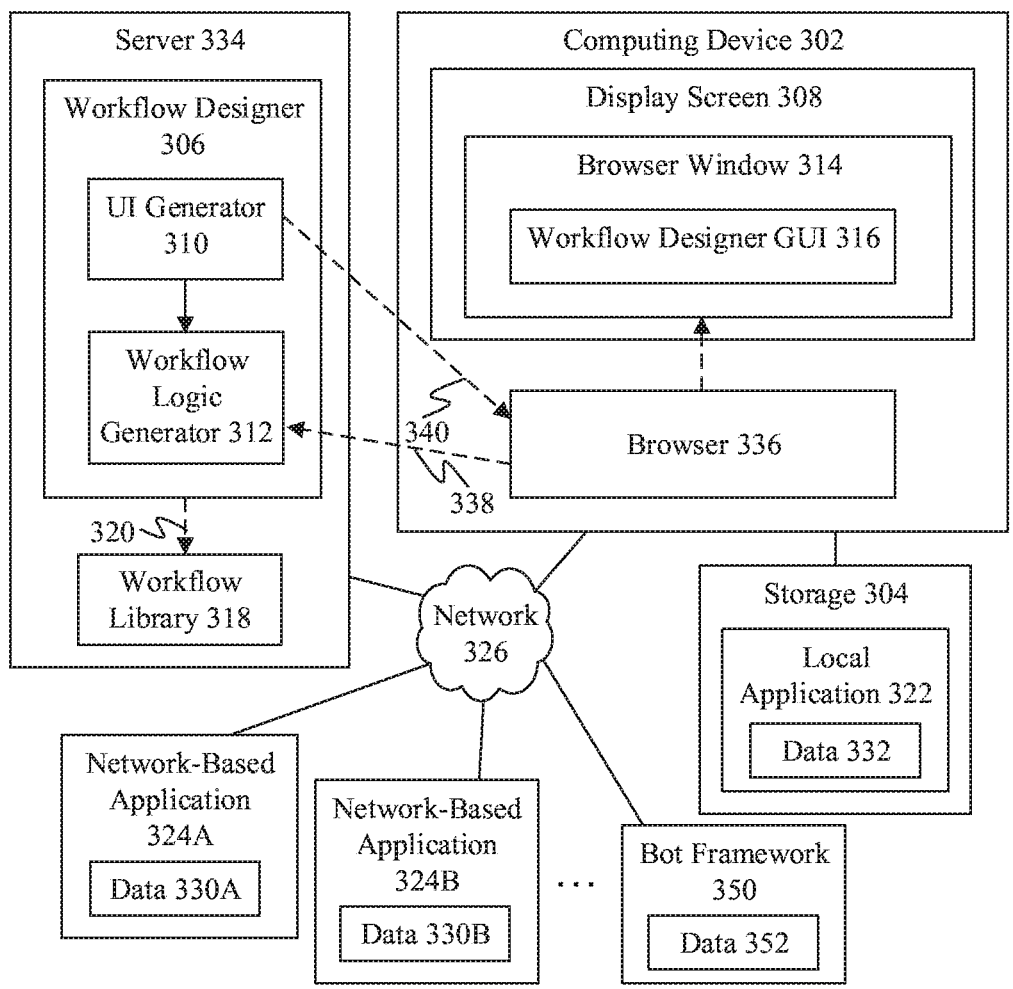
FIG. 3 is a block diagram of a workflow development system, according to an example embodiment.

Development of workflows may be enabled in various ways in embodiments. For instance, FIG. 3 is a block diagram of a workflow development system 300, according to an example embodiment. As shown in FIG. 3, system 300 includes a computing device 302, storage 304, a first network-based application 324A, a second network-based application 324B, a bot framework 350, and a server 334. Server 334 includes a workflow designer 306 and a workflow library 318 (e.g., in storage). Computing device 302 includes a display screen 308 and a browser 336. Storage 304 stores a local application 322. System 300 is described as follows.

Computing device 302 may be any type computing device, including a mobile computing device (e.g., a smart phone, a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Server 334 may include one or more server devices and/or other computing devices.

Local application 322 in storage 304 is an example of an application accessible by computing device 302 without communicating over a network. Local application 322 may be configured to perform data processing and/or data hosting operations when executed by a processor of computing device 302, and may provide data 332 to workflows developed using workflow designer 306 when such workflows are executed at runtime, or receive data 332 therefrom. Local application 322 may be any type of local application or service, such as a database application (e.g., QuickBooks®, a Microsoft® Excel® spreadsheet), an e-mail application (e.g., Microsoft® Outlook®), a productivity application (e.g., Microsoft® Word®, Microsoft® PowerPoint®, etc.), or another type of application. Although FIG. 3 shows a single local application, any number of local applications may be present at computing device 302, including numbers in the tens, hundreds, or greater numbers.

First and second network-based applications 324A and 324B are examples of network-based applications, which in some instances may be referred to as "cloud" applications or services. Network-based applications 324A and 324B are accessible by computing device 302 over network 326, may be configured to perform data processing and/or data hosting operations, and may provide data 330A and 330B, respectively, to workflows created using workflow designer 306 when such workflows are executed at runtime, or receive data 330A and 330B respectively therefrom. Network-based applications 324A and 324B may each be any type of network-accessible applications or services, such as database applications, social networking applications, messaging applications, financial services applications, news applications, search applications, productivity applications, cloud storage applications, file hosting applications, etc. Examples of such applications include a network-accessible SQL (structured query language) database, Salesforce.com™, Facebook®, Twitter®, Instagram®, Yammer®, LinkedIn®, Yahoo!® Finance, The New York Times® (at www.nytimes.com), Google search, Microsoft® Bing, Google Docs™, Microsoft® Office 365, Dropbox™, etc. Although FIG. 3 shows two network-based applications, any number of network-based applications may be accessible over network 326, including numbers in the tens, hundreds, thousands, or greater numbers.

Note that data 330A, data 330B, and data 332 may each include any type of data, including messages, notifications, calculated data, retrieved data, structured data, unstructured data, and/or any other type of information produced, requested or usable by a workflow.

Bot framework 350 comprises a network-accessible service that operates to facilitate communication between one or more bots and one or more communication channels via which the bot(s) can communicate with end users. In one embodiment, bot framework 350 comprises Microsoft® Bot Framework, developed and published by Microsoft Corporation of Redmond, as described in a preceding section. Bot framework 350 is accessible by computing device 302 over network 326, and may provide data 352 (e.g., messages and message-related data) to workflows (e.g., bots) created using workflow designer 306 when such workflows are executed at runtime, or receive data 352 therefrom.

Computing device 302 and server 334 may each include at least one wired or wireless network interface that enables communications with each other and with network-based applications 324A and 324B and bot framework 350 over network 326. Examples of such a network interface include an IEEE 802.11 wireless LAN (WLAN) wireless interface, a Worldwide Interoperability for Microwave Access (WiMAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 326 include a local area network (LAN), a wide area network (WAN) such as the Internet, a personal area network (PAN), and/or a combination of communication networks.

Workflow designer 306 is configured to be operated/interacted with to create applications in the form of workflows. For instance, a developer may access workflow designer 306 by interacting with an application at computing device 302 that is capable of accessing a network-based application, such as browser 336. The developer may use browser 336 to traverse a network address (e.g., a uniform resource locator) to workflow designer 306, which invokes a workflow designer GUI 316 (e.g., a web page) in a browser window 314. The developer is enabled to interact with workflow designer GUI 316 to develop a workflow.

As shown in FIG. 3, workflow designer 306 includes a UI generator 310 and a workflow logic generator 312. UI generator 310 is configured to transmit workflow GUI information 340 (e.g., one or more web pages, image content, etc.) to browser 336 to be displayed as workflow designer GUI 316 within browser window 314 in display screen 308. Workflow designer GUI 316 may be interacted with by a developer to select and configure workflow steps into a workflow. For example, the developer may insert and sequence a plurality of workflow steps in workflow designer GUI 316, with one or more of the steps being associated with a local or network-based application or with a bot framework. Browser 336 stores the selected workflow steps, corresponding configuration information, and workflow step sequence information as constructed workflow information 338. Constructed workflow information 338 is transmitted to workflow logic generator 312 at server 334. Workflow logic generator 312 generates workflow logic 320 based on the assembled workflow represented by constructed workflow information 338. The workflow represented by workflow logic 320 may subsequently be invoked for execution by an end user.

During runtime execution of the workflow, workflow logic 320 may invoke operation of one or more local or network-based applications associated with the workflow steps of workflow logic 320. Each workflow step may receive input data from or transmit output data to the one or more local or network-based applications. Such input or output data may include, for example, data 332 received from or sent to local application 322, data 330A received from or sent to network-based application 324A, data 330B received from or sent to network-based application 324B, data received from or sent to another application, and/or data received from or sent to another workflow step of workflow logic 320.

During runtime execution of the workflow, workflow logic 320 may also interact with bot framework 350. For example, during runtime execution of the workflow, a workflow step may receive a message directed to the workflow from bot framework 350 or may send a message on behalf of the workflow to bot framework 350. The message sent to bot framework 350 may be received by bot framework 350 and then forwarded to an end user via a desired communication channel. The messages and any message-related data communicated between the workflow and bot framework 350 is represented in FIG. 3 as data 352.

Figure 4:
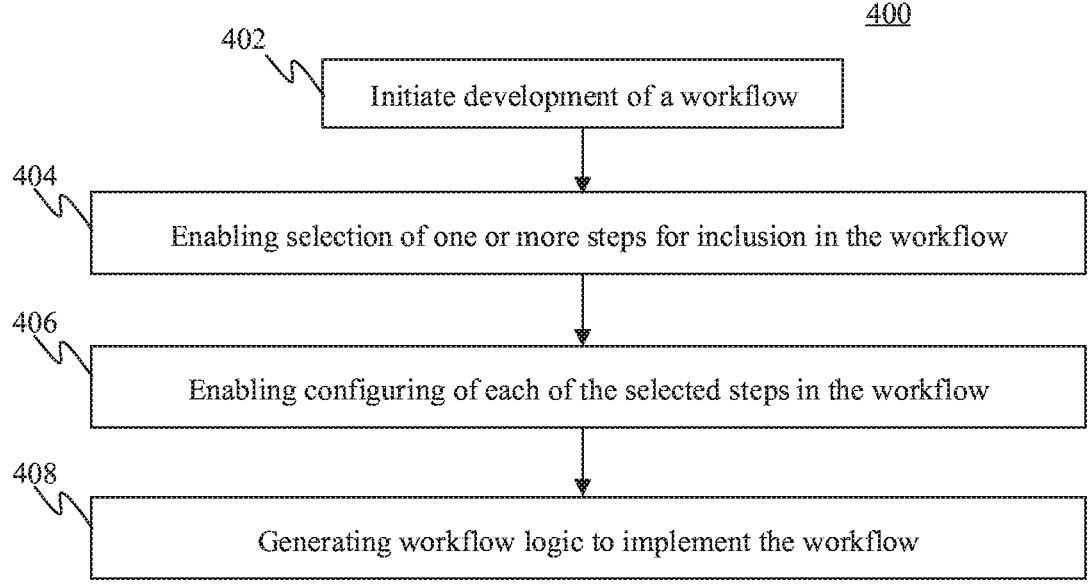
FIG. 4 depicts a flowchart of a process for development of workflows, according to an example embodiment.
Figure 5:
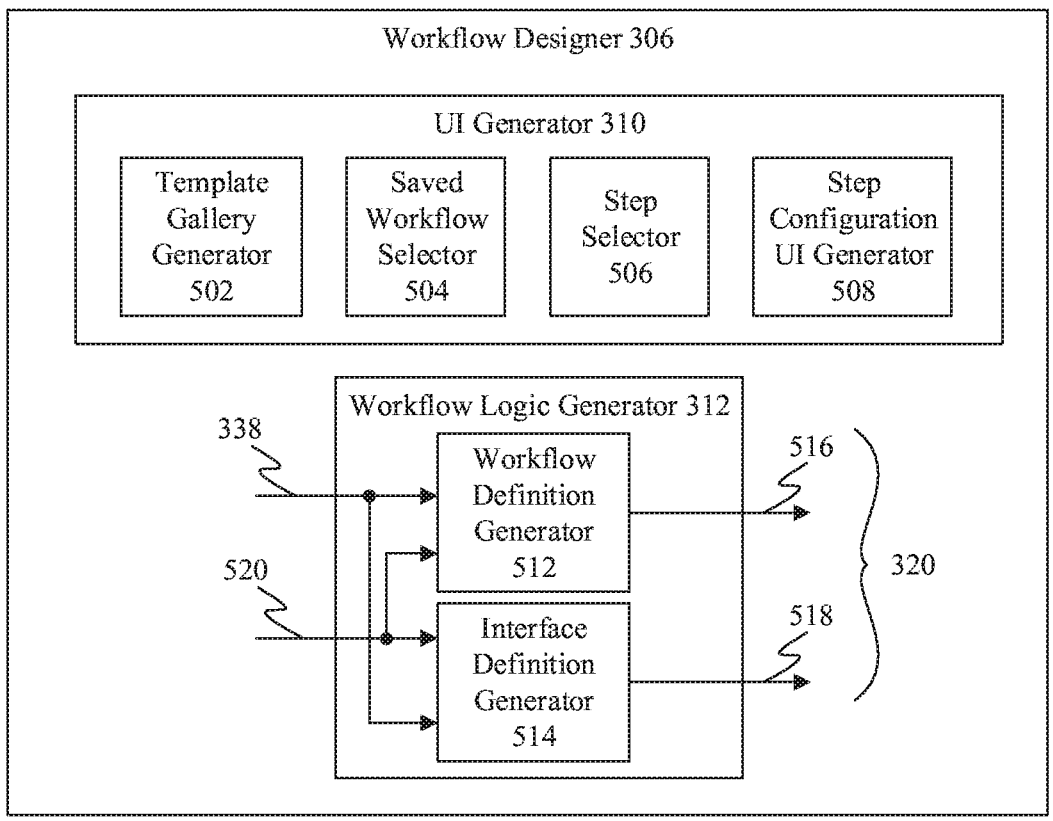
FIG. 5 is a block diagram of a workflow designer application, according to an example embodiment.
Figure 6:
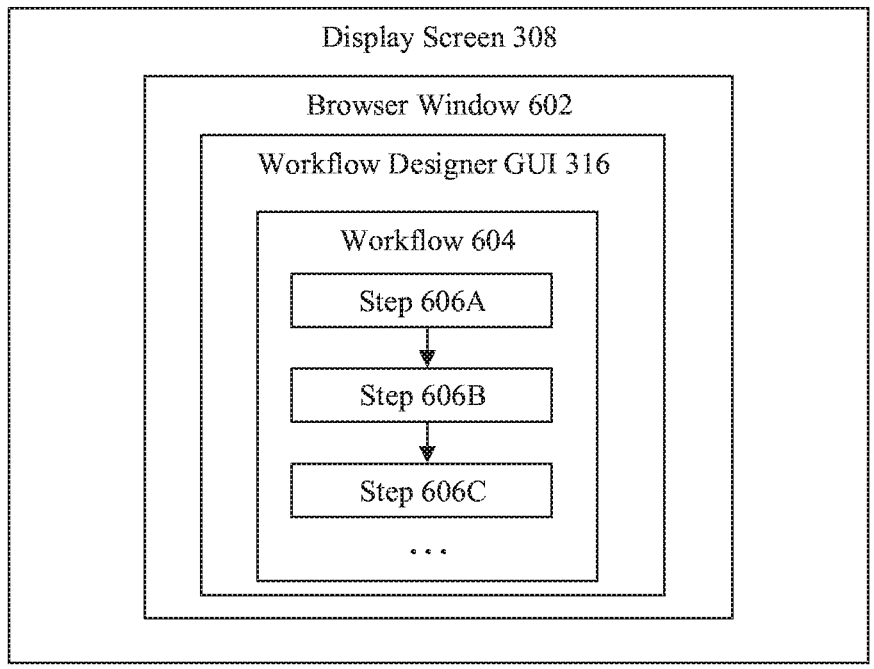
FIG. 6 is a block diagram of a display screen showing a browser window displaying an exemplary workflow, according to an example embodiment.

Workflow designer 306 may operate in various ways, to enable development of a workflow. For instance, in embodiments, workflow designer 306 may operate in accordance with flowchart 400 of FIG. 4. In particular, flowchart 400 depicts a process for development of workflows, according to an example embodiment. Flowchart 400 and workflow designer 306 are described as follows with respect to FIGS. 5 and 6. FIG. 5 is a block diagram of workflow designer 306, according to an example embodiment. As shown in FIG. 5, workflow designer 306 includes UI generator 310 and workflow logic generator 312. UI generator 310 includes a template gallery generator 502, a saved workflow selector 504, a step selector 506, and a step configuration UI generator 508. Workflow logic generator 312 includes a workflow definition generator 512 and an interface definition generator 514. FIG. 6 is a block diagram of display screen 308, illustrating an example of workflow designer GUI 316 displayed in browser window 602 on display screen 308, according to an example embodiment Flowchart 400 of FIG. 4 begins with step 402. In step 402, development of a workflow is initiated. For example, in an embodiment, workflow designer 306 may be invoked by a developer interacting with browser 336 at computing device 302. The developer may traverse a link or other network address directed to workflow designer 306 at server 334, to invoke workflow designer 306, causing workflow designer 306 to provide workflow GUI information 340 (e.g., one or more web pages, image content, etc.) to browser 336 to be displayed as workflow designer GUI 316 in display screen 308 in browser window 314. Once invoked, the developer may open an existing workflow for further development, or may begin developing a new workflow.

In one example, a displayed page of workflow designer GUI 316 may display a template gallery generated by template gallery generator 502. The template gallery may include a plurality of selectable workflow templates, each of which includes one or more pre-selected workflow steps that are suitable for further configuration by a developer. The workflow templates may be stored in workflow library 318, and accessed for display by workflow designer GUI 316. The developer may select one of the workflow templates for inclusion in their workflow, and may proceed with configuring the contents of the workflow template, and/or may add additional workflow steps to the workflow steps of the workflow template to generate a more complex workflow.

For instance, in the example of FIG. 6, steps 606A and 606B may have been included in a workflow template placed in workflow 604, and step 606C may have been subsequently added (e.g., via selection from a menu or other list of workflow steps).

In another example, saved workflow selector 504 may enable the developer to select an existing, saved workflow to be opened for further editing in a displayed page of workflow designer GUI 316. The saved workflows may be stored in workflow library 318 or elsewhere. For example, saved workflow selector 506 may display a list of saved workflows, may enable navigation to a saved workflow, and/or may provide another mechanism for selecting a saved workflow for editing. The developer may then proceed with further configuring the contents of the workflow, adding workflow steps, modifying workflow steps, removing workflow steps, or the like.

In yet another example, a displayed page of workflow designer GUI 316 may provide a blank window, area or canvas to which one or more developer-selected workflow steps may be added, ordered and configured. Such blank window, area or canvas may be generated by UI generator 310 automatically or in response to some developer input or interaction.

In step 404, selection of one or more steps for inclusion in the workflow is enabled. When a developer is editing a workflow, step selector 506 may enable the developer to select workflow steps for inclusion in the workflow, and to order the steps. The workflow steps may be accessed by step selector 506 in workflow library 318. For instance, step selector 506 may display a menu of workflow steps, a scrollable and/or searchable list of available workflow steps, or may provide the workflow steps in another manner, and may enable the developer to select any number of workflow steps from the list for inclusion in the workflow.

In one example, step selector 506 may enable a developer to select a step that is associated with a local application, such as Microsoft® Outlook®, or a network-based application, such as Facebook®. Step selector 506 may also enable a developer to select a step that is associated with receiving a message from or sending a message to bot framework 350. Step selector 506 enables the steps to be chained together in a sequence, optionally with conditional steps, for inclusion in workflow logic 320.

In step 406, each of the selected steps in the workflow is enabled to be configured. In an embodiment, step configuration UI generator 508 enables configuration of each workflow step in a workflow. Step configuration UI generator 508 accesses each selected workflow step in workflow library 318 to determine the configuration of the workflow step, including all of its input parameters and any other selections or information that a developer needs to provide to the workflow step to configure it. For example, step configuration UI generator 508 may generate a UI that enables the developer to type, navigate to, use a pull-down menu, or otherwise enter input data into a text input box or other data entry element to configure (e.g., specify an input parameter of) a workflow step. The developer may configure an output parameter of a prior step to be input data for a workflow step. Step configuration UI generator 508 may enable data or other objects to be copied and pasted, dragged and dropped, or otherwise entered from elsewhere into data entry elements of a workflow step.

In step 408, workflow logic to implement the workflow is generated. In an embodiment, workflow logic generator 312 is configured to package and generate workflow logic 320 based on constructed workflow information 338 when the developer indicates the workflow is finished, such as when the developer interacts with workflow designer GUI 316 to save the workflow. As shown in FIG. 5, workflow logic generator 312 receives constructed workflow information 338. Constructed workflow information 338 indicates which workflow steps have been inserted into the workflow, their input parameter values, and their sequencing. Workflow logic generator 312 also receives selected workflow logic 520, which is the workflow logic for each workflow step of the workflow as indicated in constructed workflow information 338. In one example, workflow logic generator 312 retrieves workflow logic from workflow library 318 for each workflow step indicated in constructed workflow information 338, to receive selected workflow logic 520. Workflow logic generator 312 generates workflow logic 320 for the workflow based on constructed workflow information 338 and selected workflow logic 520. For example, workflow logic generator 312 may generate workflow logic 320 in the form of an executable file, a zip file, or other form, which may be executed in a standalone fashion, may be executed in a browser, or may be executed in another manner, depending on the particular type of workflow being generated.

With reference to FIG. 5, workflow logic generator 312 may generate workflow logic 320 to include at least two components (e.g., files): workflow definition information 516 and interface definition information 518. Workflow definition information 516 includes information that defines the sequence and operation of the workflow of workflow logic (e.g., lists the workflow step operations and their ordering/sequencing) and includes the parameter values for the workflow. For example, workflow definition information 516 may be generated to contain information in the format of a JSON (JavaScript object notation) file or in another form. Interface definition information 518 includes information that defines the interfaces/parameters (e.g., inputs and outputs) of the workflow steps of the workflow. For example, interface definition information 518 may be generated to contain information in the format of a Swagger (a specification for REST (representational state transfer) web services) file or in another form. For instance, each workflow step may be represented in workflow library 318 as API (application programming interface) metadata in Swagger format, defining what are the inputs and outputs (parameters) of the workflow step, such that a service may be accessed according to the API definition. In such an implementation, the operations in the workflow definition information 516 refer to the corresponding API metadata in the interface definition information 518 to provide a complete structure of a generated workflow (e.g., each sequenced workflow step/operation defined with parameter values in the workflow definition information 516 has a corresponding API, which is defined in the interface definition information 518).

Accordingly, flowchart 400 and workflow designer 306 enable a developer to create workflows. FIGS. 7-10 show views of an exemplary workflow in various phases of development using a workflow designer GUI, according to example embodiments. For example, each of FIGS. 7-10 shows browser window 602 displaying a corresponding view of workflow designer GUI 316 being used to develop a workflow.

Figure 7:
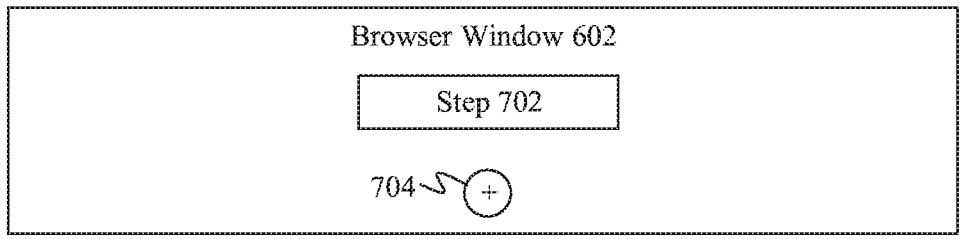
FIGS. 7-10 show views of an exemplary workflow in various phases of development using a workflow designer GUI, according to example embodiments.

For instance, FIG. 7 shows browser window 602 including a workflow step 702 and an add interface 704. Workflow step 702 was selected by a developer to be a first step in a workflow. Add interface 704 (e.g., a button or other GUI control) may be interacted with by the developer to add further workflow steps to the workflow.

As described above, a developer is enabled to select workflow step 702 from a list or library of steps, a template gallery, or elsewhere. A list, library, or gallery may include any number of workflow steps. The workflow steps may be associated with network-based applications mentioned elsewhere herein or otherwise known (e.g., Dropbox™), with local applications mentioned elsewhere herein or otherwise known (e.g., Microsoft® Outlook®), or with a bot framework (e.g., Microsoft® Bot Framework). Each workflow step is configured to be plugged into the workflow. Each workflow step is configured with the appropriate logic and/or interface(s) to perform its respective function(s), which may include communicating with a local or remote application or communicating with a bot framework. For instance, a workflow step for transmitting a query to an application (e.g., a search query to a search engine, a database query to a database, a request for data from a social networking application, etc.) may be pre-configured in terms of how to properly transmit and format such a request to the application. As another example, a workflow step for receiving a response to a request may be pre-configured in terms of how to parse the response for desired response data. As yet another example, a workflow step for receiving a message directed to a bot may be pre-configured in terms of how to parse the message and any message-related data appended thereto to obtain information necessary for proper handling of the message. As such, a developer of a workflow does not need to know how to write program code in a programming language, to interface with complex application interfaces (e.g., application programming interfaces (APIs)), or to understand network communication protocols, as the workflow steps are already set up. When a workflow step is plugged into workflow logic by a developer, the developer configures the inputs to the workflow step (as described below), and the pre-configured workflow step handles any communications with other applications.

Figure 8:
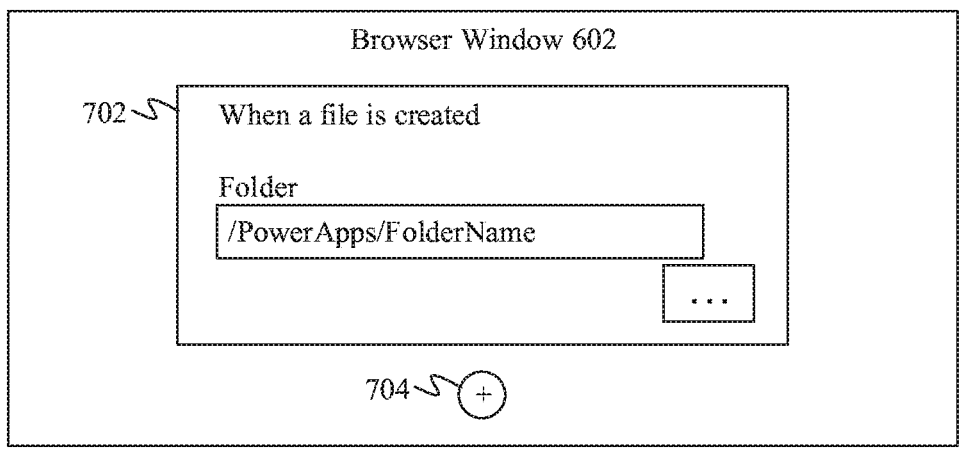

In FIG. 8, the developer has interacted with step 702 (e.g., by mouse click, etc.) to cause step configuration UI generator 510 to generate a UI for configuration of step 702. For instance, in the example of FIG. 8, workflow step 702 is configured to perform monitoring to determine if a file has been created in a particular folder identified by the developer in a text input box (e.g., by typing, clicking on a navigator indicated by " . . . ", etc.). When workflow step 702 determines that a file has been added to the indicated folder, a workflow step following workflow step 702 is triggered. Thus, workflow step 702 may be considered a trigger step in this example.

Figure 9:
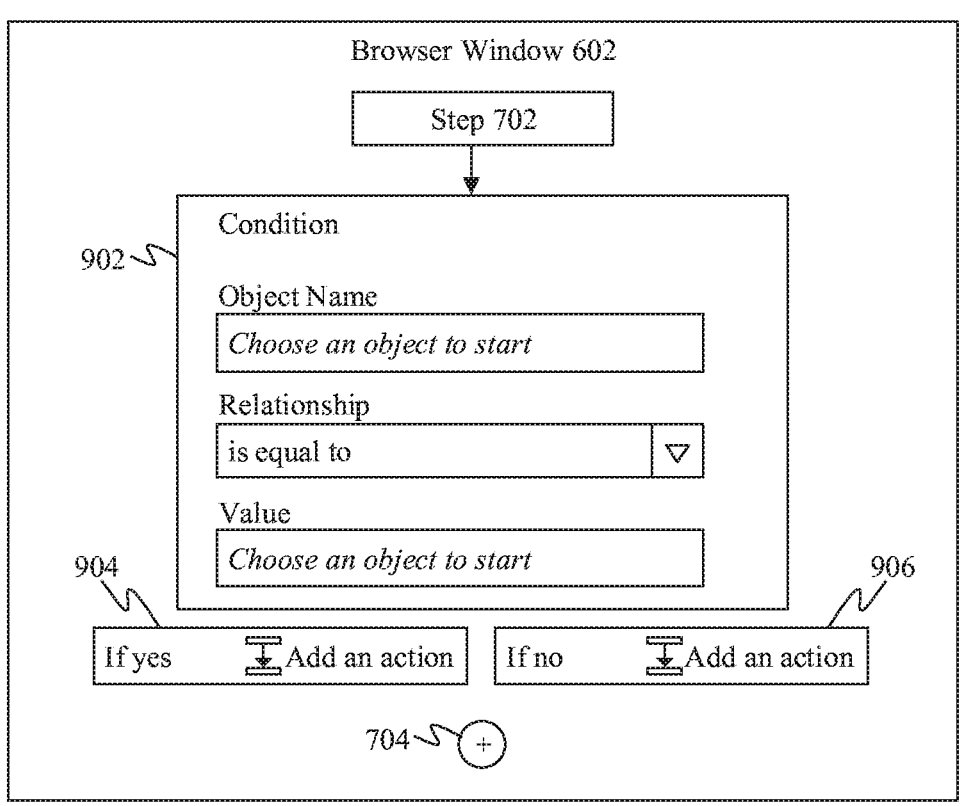

For instance, in FIG. 9, the developer interacted with add interface 704 to facilitate the selection of a next workflow step 902. For instance, in an embodiment, interaction with add interface 702 invokes step selector 506 in FIG. 5, which enables the developer to select a workflow step. In the example of FIG. 9, workflow step 902 is a conditional step. In embodiments, logical elements may be selected for inclusion in a workflow, including arithmetic logic (e.g., summers, multipliers, etc.), conditional logic, etc., that operate based on variable values determined in earlier workflow steps. The condition of workflow step 902 enables the workflow to branch based on the determination of a condition (e.g., a variable value). The condition may include an object name, a relationship (e.g., a logical relationship, such as equal to, includes, not equal to, less than, greater than, etc.), and a value, which are all defined by the developer interacting with workflow step 902. Corresponding action steps may be performed depending on which way the workflow branches based on the condition.

For instance, in one illustrative example of FIG. 9, the object name may be selected (e.g., from a list of possibilities) to be a name of the created file of workflow step 702, the relationship may be "contains" (e.g., selected by a pull-down menu) and the value may be "dummyfile" (e.g., typed in by the developer). The condition evaluates to a "yes" condition if the file name contains "dummyfile," which invokes first action workflow step 904, and evaluates to "no" condition if the file name does not contain "dummyfile," which invokes second action workflow step 906. An action may be defined for one or both of the "yes" and "no" action workflow steps 904 and 906 by the developer, if desired.

Figure 10:
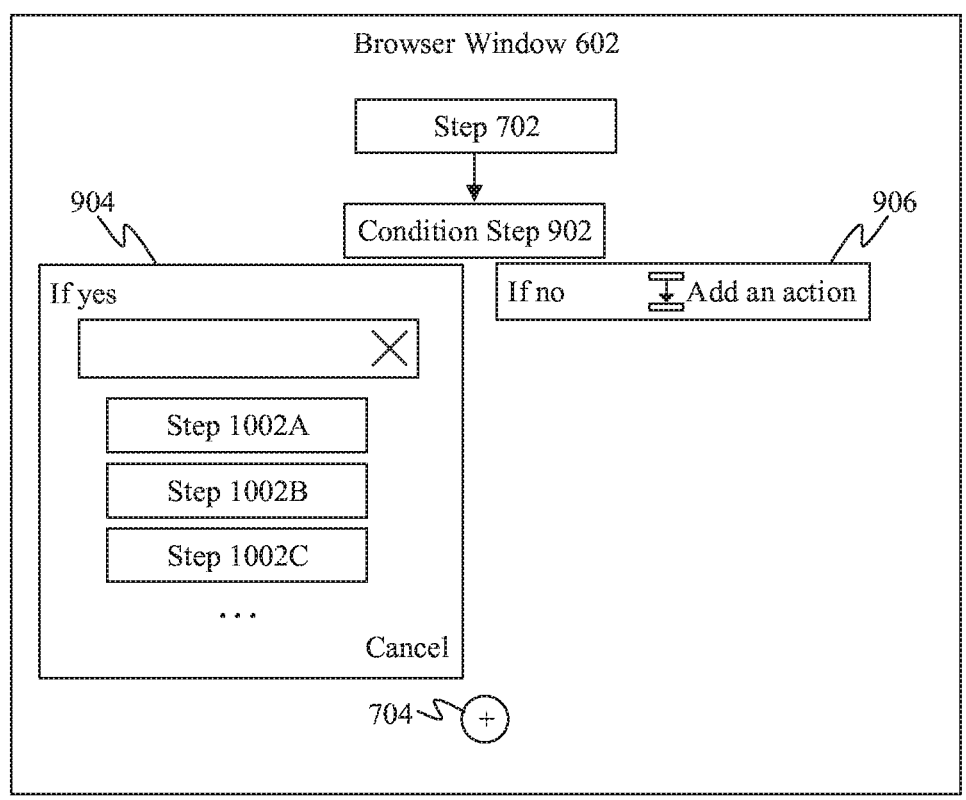

For example, in FIG. 10, the developer interacts with action workflow step 904 to define an action. In this example, the developer is defining action workflow step 904 by selecting a workflow step via step selector 506. As shown in FIG. 10, a list of workflow steps 1002A, 1002B, 1002C is displayed, from which the developer can select a workflow step (e.g., by mouse click, etc.) to be performed for action workflow step 904. The workflow step can be a trigger step, an action step, or a condition step. After selecting the workflow step, the developer may configure the workflow step as described above. Furthermore, the developer may configure an action for workflow step 906, may add further workflow steps, etc., eventually being enabled to save the workflow.

It is noted that in some embodiments, a workflow step, such as first workflow step 702, may require credentials (e.g., a login and password) to access a particular application or data (e.g., to access a file at the location indicated in the text input box in FIG. 8), or to access a particular bot framework account. As such, the developer may be requested to provide credential information in association with first workflow step 702 so that when first workflow step 702 is performed at runtime, the data may be accessed. Alternatively, the credentials may be requested of a user during runtime.

According to embodiments, end users may execute workflows developed as described herein. During operation, an end user may interact with a GUI of the workflow, which may lead to workflow logic being executed. The workflow logic may execute locally (e.g., in a browser) and/or at a remote service (in "the cloud"). The workflow logic may transmit data to or receive data from of one or more local or network-accessible applications or a bot framework as was configured by the developer. Accordingly, the workflow performs its intended functions.

Figure 11:
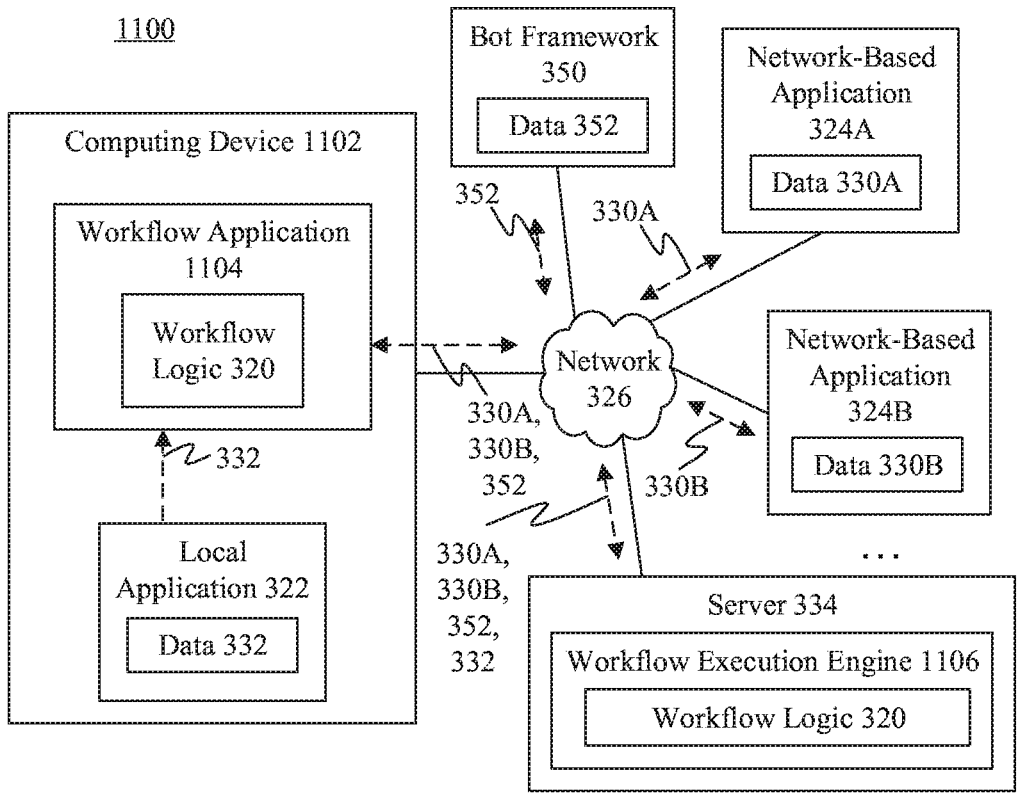
FIG. 11 is a block diagram of a system for executing a workflow in a runtime environment, according to an example embodiment.

FIG. 11 is a block diagram of a system 1100 for executing a workflow that includes one or more workflow steps in a runtime environment, according to an example embodiment. As shown in FIG. 11, system 1100 includes a computing device 1102, first network-based application 324A, second network-based application 324B, bot framework 350, and server 334. Computing device 1102 includes a workflow application 1104. Server 334 includes a workflow execution engine 1106. System 1100 is described as follows.

First and second network-based applications 324A and 324B and bot framework 350 are each optionally present, and whether or not such entities are communicated with will depend on the configuration of workflow logic 320. Further network-based applications and services may be present and communicated with, depending on the configuration of workflow logic 320.

Computing device 1102 may be any type of stationary or mobile computing device described herein or otherwise known. Computing device 1102 is configured to communicate with first and second network-based applications 324A and 324B, bot framework 350, and server 334 over network 126.

In one embodiment, workflows are executed at server 334 by workflow execution engine 1106, and workflow application 1104 is a UI application that enables an end user at computing device 1102 to interact with the executing workflows, such as by selecting and invoking the workflows, receiving communications from the executing workflows (e.g., messages, alerts, output data, etc.), providing requested input data to executing workflows, etc. In such an embodiment, workflow application 1104 may be a workflow UI application associated with workflow execution engine 1106 (e.g., workflow application 1104 may be an extension of workflow execution engine 1106) that may operate separately from or within a browser at computing device 1102, or may be configured in another way. As shown in FIG. 11, workflow execution engine 1106 may load workflow logic 320 for a selected workflow (e.g., selected from a workflow library by a user), and may execute workflow logic 320 to execute the workflow.

In another embodiment, workflow application 1104 may be configured to execute workflows at computing device 1102. For instance, an end user of computing device 1102 may interact with a user interface of workflow application 1104 to select and invoke a particular workflow (e.g., selected from a workflow library). In such embodiments, workflow logic 320 may operate separately from or in a browser at computing device 1102, or may be configured in another way. As shown in FIG. 11, workflow application 1104 may load workflow logic 320 for a selected workflow (e.g., selected from a workflow library by a user), and may execute workflow logic 320 to execute the workflow.

In another embodiment, a first portion of workflow logic 320 may execute in workflow application 1104 at computing device 1102 and a second portion of workflow logic 320 may execute in workflow execution engine 1106 at server 334 and/or elsewhere.

Figure 12:
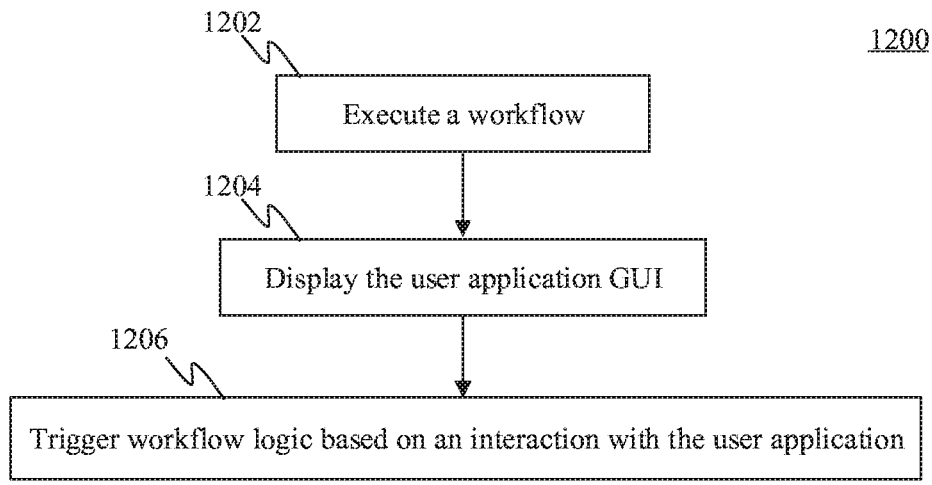
FIG. 12 depicts a flowchart of a process for executing a user application that includes one or more workflows in a runtime environment, according to an example embodiment.

FIG. 12 depicts a flowchart 1200 of a process for executing workflow logic 320 of a workflow in a runtime environment, according to an example embodiment. Flowchart 1200 is described as follows with respect to system 1100 of FIG. 11 for illustrative purposes.

Flowchart 1200 begins with step 1202. In step 1202, the workflow is executed. In an embodiment, an end user at computing device 1102 may cause workflow logic 320 to be executed, such as by command line, by clicking/tapping or otherwise interacting with an icon representing the application, by selection in a browser, or in another manner. As described above, workflow logic 320 may execute in workflow application 1104 at computing device 1102 and/or in workflow execution engine 1106 at server 334. When executed, the workflow steps of workflow logic 320 are performed in the configured sequence. Accordingly, one or more of the workflow steps may make calls to corresponding applications/services to perform their functions, such as local application 322 (to send data 332 thereto or obtain data 332 therefrom), network-based application 324A (to send data 330A thereto or obtain data 330A therefrom), network-based application 324B (to send data 330B thereto or obtain data 330B therefrom), bot framework 350 (to send data 352 thereto or receive data 352 therefrom) and/or other local or network-based applications or services.

In step 1204, the workflow GUI is displayed. Step 1204 is optional, as in some embodiments, a GUI is not displayed for a workflow. In an embodiment, the GUI may be displayed by workflow application 1104 at computing device 1102. When displayed, the end user may interact with the GUI by reviewing displayed data (e.g., from a file, database record, spreadsheet, or other data structure read by the workflow), by entering data into the GUI (e.g., by typing, by voice, etc.), and/or by interacting with one or more controls displayed by the GUI.

In step 1206, workflow logic is triggered based on an interaction with the workflow. Step 1206 is optional in cases where one or more workflow steps of a workflow require input from an end user. In such cases, the end user interacts with a control in a GUI of workflow application 1104 associated with a workflow step of workflow logic 320 to provide information that triggers logic of the workflow step to operate.

In this manner, workflow logic 320 performs its functions, such as processing orders, tracking information, generating messages, processing documents to generate tasks or information, collecting feedback, implementing a bot, and/or any other functions.

B. Example Workflow Development System GUI and Workflow Steps for Creating a Bot As discussed in the preceding section, workflow development system 300 enables a user to build a workflow by selectively adding predefined workflow steps to a workflow under development via workflow designer GUI 316. In accordance with an embodiment, a user can utilize workflow development system 300 to build a bot, such that a completed workflow comprises the bot logic. The user is enabled to build the bot as a series of connected steps (e.g., triggers and actions) that can be retrieved on behalf of the user by workflow development system 300 and graphically represented within workflow designer GUI 316. Once the steps are included within the workflow under development, the user may configure various parameters (e.g. input parameters) of each workflow step and then save the workflow for subsequent execution.

In further accordance with such an embodiment, a set of predefined steps relating to bot interactions are made available to the user for selective inclusion in the workflow. For example, step selector 506 of UI generator 310 may cause such steps to be displayed to the user via workflow designer GUI 316 for selection thereby. Also, template gallery generator 502 may display one or more user-selectable workflow templates, wherein each of the templates includes one or more predefined workflow steps relating to bot interaction that can then be further configured by a user. Still other methods may be used to enable a user to select one or more workflow steps relating to bot interaction for inclusion within a workflow under development.

The aforementioned steps can be used to implement a script for managing interaction between the bot and an end user. These steps can also be combined with other workflow steps that are designed to interact with other applications (e.g., email applications, document management applications, database applications, social networking applications, financial services applications, news applications, search applications, productivity applications, cloud storage applications, file hosting applications, etc.) so that such other applications can be invoked to perform actions in response to certain interactions between the bot and an end user and also to obtain information that can be used to facilitate such interactions.

In an embodiment, the predefined workflow steps relating to bot interaction may include, but are by no means limited to, the following:

When a bot receives a message. This step may be used as a trigger for starting execution of a workflow. In an embodiment, this step may be performed at runtime when a message directed to the bot (workflow) is received from a bot framework, such as bot framework 350 as described in the preceding section. The message may have been received by bot framework 350 from an end user over one of a plurality of different communication channels. Bot framework 350 may append information about the message to the message itself and then forward the message and appended information to the executing workflow.

In one embodiment, upon receipt of a message directed to a bot registered with bot framework 350, bot framework 350 maps an application identifier (ID) associated with the bot to a workflow ID associated with the workflow that implements the bot, and then sends the message (and any added information) to the workflow having the relevant workflow ID. The workflow ID may exist within a namespace that is used for accessing bots implemented as workflows. In further accordance with such an embodiment, a user that intends to use a workflow developed using workflow development system 300 as a bot may provide this namespace as an endpoint for their bot when registering it with bot framework 350.

Send to conversation. This step comprises an action step that can send developer-specified text to a particular conversation that has been initiated by or with an end user via bot framework 350.

Wait for response. This step waits on a particular conversation that has been initiated by or with an end user via bot framework 350 for the end user to send a reply.

In one embodiment, a user of workflow development system 300 is enabled to set up a connection between the bot (implemented as a workflow) and bot framework 350 so that bot framework 350 can send and receive messages on behalf of the bot over one or more communication channels, thereby further simplifying the deployment of the bot. In an embodiment, setting up the connection comprises providing at least the following information: a connection name (an identifier that identifies the connection), an application ID (this is the ID of the bot that has been registered with bot framework 350), and a password (this is secret information that is used to authenticate the user for whom the connection is to be established).

As was previously described, workflow designer 306 generates workflow designer GUI 316 that enables a developer to configure a workflow step within a workflow under development, wherein such configuration includes specifying a value of an input parameter for the workflow step. In an embodiment, workflow designer GUI 116 enables a developer to easily specify a value of an input parameter of a second workflow step to include a value of an output parameter of a first workflow step in the same workflow.

In particular, in accordance with an embodiment, workflow designer GUI 116 represents output parameters of a first workflow step of a workflow under development as user-interactive objects. These objects can be easily interacted with (e.g., clicked on or dragged and dropped) by a developer to cause the objects to be inserted into a data entry element (e.g. a text box) that is used to specify a value for an input parameter of a second workflow step of the workflow under development. When executable logic representing the first and second workflow steps is generated, the aforementioned insertion of the objects into the data entry element has the effect of causing the value of the input parameter of the second workflow step to be defined to include the values of the output parameters that correspond to the inserted objects.

In an embodiment, the first workflow step may comprise a workflow step related to bot interaction (e.g., "when a bot receives a message" or "wait for response"). In accordance with such an embodiment, the output parameters of the first workflow step that may be represented as user-interactive objects may include but are not limited to:

Type. The activity type. This can be "message," "typing", etc. The triggers and actions discussed above are all messages, but it possible to expose other actions with other message types.

Service URL. The endpoint for the particular channel to which the bot should respond. For example, in some embodiments, the endpoint may be something like https://skype.botframework.com, https://slack.botframework.com, etc.

Text. The message text that the end user input (e.g., typed).

Text Format. A format of the text. For example, in some embodiments, the message can be formatted using either plaintext or markdown.

Locale. A particular locale associated with the conversation.

Topic Name. A descriptive topic for the conversation.

Summary A summary of the conversation.

From ID and From Name. Data identifying the sender of the message.

Recipient ID and Recipient Name. Data identifying the receiver of the message. In some embodiments, these parameters should always identify the bot framework itself, but every channel may use different names and IDs.

Conversation ID. A unique identifier of the conversation. In some embodiments, a different format for the conversation ID may be used for different channels.

Conversation Name. A name for the conversation.

Is Group Conversation. An indicator that indicates whether the conversation is private or involves multiple end users. For example, some channels support 3+-way conversations.

Reply To ID. The specific ID of the message. This is important to maintain conversations on some channels (like email).

Channel ID. An identity for the channel over which the message was received.

Each of these output parameters of the first workflow step may comprise part of a message that was received by bot framework 350 or may comprise information that was appended to such a message by bot framework 350 or a channel over which such message was received.

To help illustrate some of the foregoing concepts, FIGS. 13-18 depict example GUI screens of a workflow development system that can be used to create a bot in accordance with an embodiment. These screens may be generated, for example, by UI generator 310 of workflow designer 306 as previously described in reference to workflow development system 300 of FIG. 3. The bot being developed in this example can guide a user through the steps of filling out a form for, say, a sales contact. The bot can go through several rounds of request/response and finally create an item in a Microsoft® Sharepoint® list or send an email to someone in the company. A webchat control that is hooked up to the bot could be embedded in some website that the user visit, and the user could initiate the conversation by typing "Hi."

Figure 13:
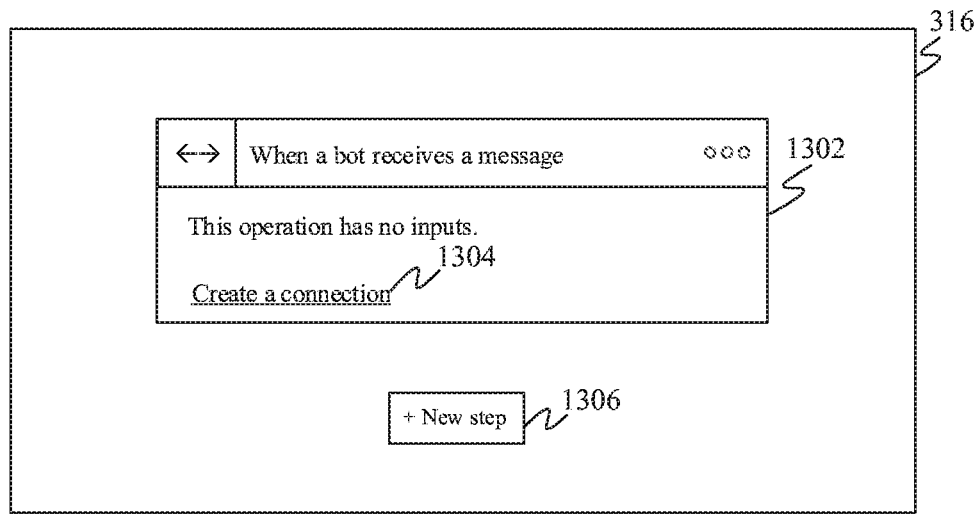
FIGS. 13-18 depict example graphical user interface (GUI) screens of a workflow development system that can be used to create a bot in accordance with an embodiment.

In particular, as shown in FIG. 13, the user has selected the first step of the workflow to be the trigger step "when a bot receives a message," which has no user-configurable input parameters. This step is represented as an interactive object 1302 within workflow designer GUI 316. At runtime, this step is triggered when a message is received for the workflow-implemented bot. In one embodiment, this step is triggered when bot framework 350 receives a message from a user and forwards it to the workflow. In response to the triggering of this step, the workflow may subsequently respond and wait for more messages using the conversation ID provided as an output of the trigger step.

As further shown in FIG. 13, interactive object 1302 includes an element 1304 that a user can interact with (e.g., click on) to engage in a process for setting up a connection between the workflow and bot framework 350 so that, at runtime, bot framework 350 can send and receive messages on behalf of the workflow over one or more communication channels. As also shown in FIG. 13, a "new step" element 1306 is also included within workflow designer GUI 316 and a user can interact with this element to add an additional step to the workflow.

Figure 14:
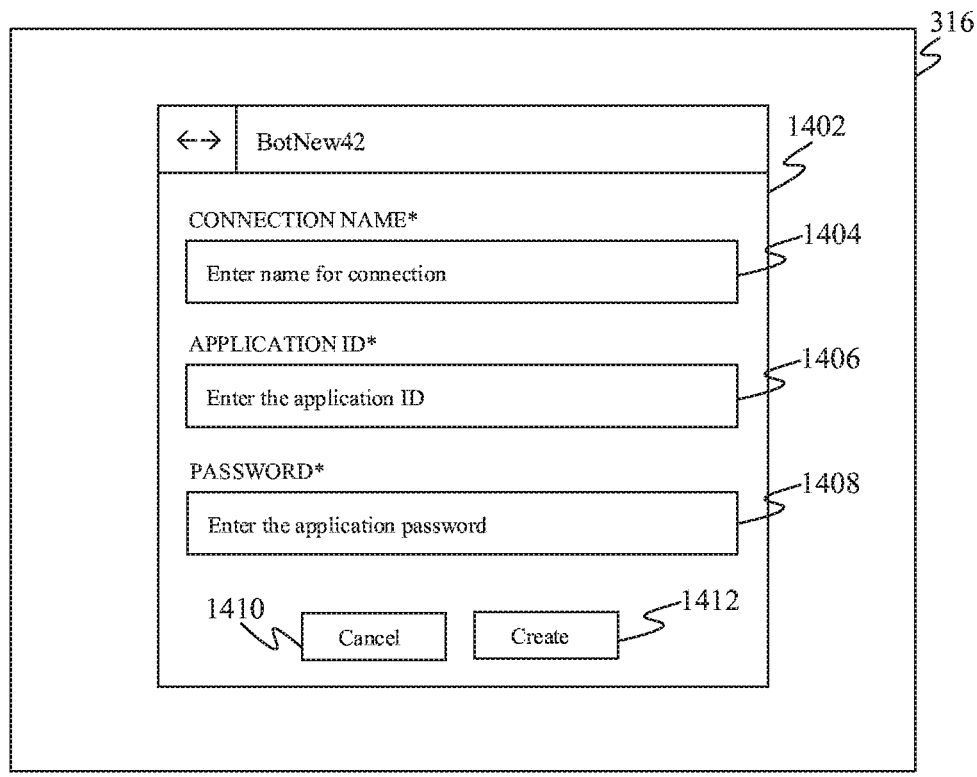

FIG. 14 shows an interactive object 1402 that may be displayed within workflow designer GUI 316 in response to a user interacting with element 1304 to initiate the process for setting a connection to bot framework 350. As shown in FIG. 14, interactive object 1402 includes a first data entry element 1404 into which the user can input a connection name, a second data entry element 1406 into which the user can input an application ID, and a third data entry element 1408 into which the user can input a password. As previously discussed, in an embodiment, the connection name comprises an identifier that identifies the connection, the application ID is the ID of the bot that has been registered with bot framework 350, and the password is secret information that is used to authenticate the user for whom the connection is to be established. As further shown in FIG. 14, interactive object 1402 also includes a "cancel" button 1410 that a user can interact with to cancel the process for setting up the connection and a "create" button 1412 that a user can interact with to complete the process for setting up the connection.

Figure 15:
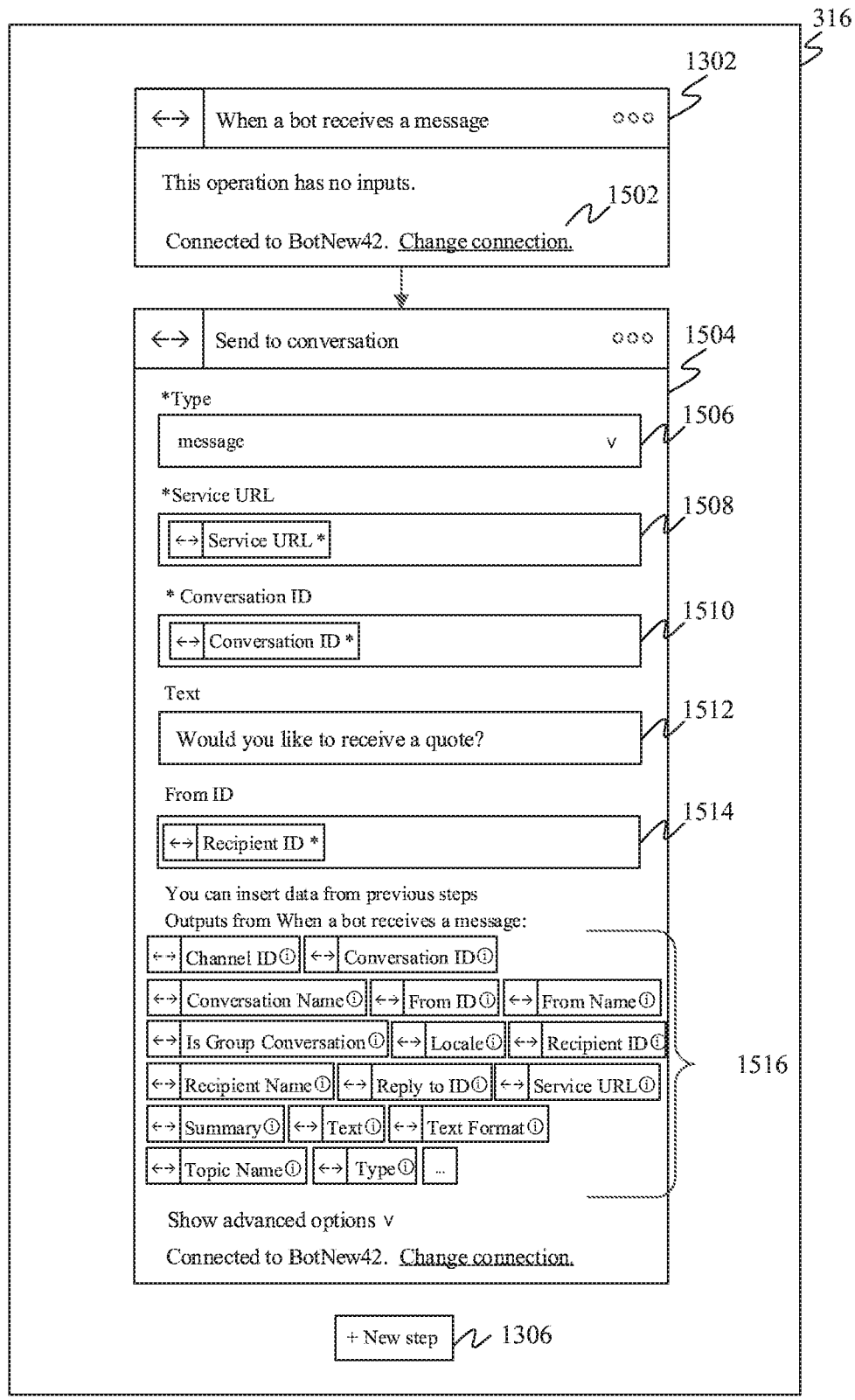

FIG. 15 shows the workflow of FIG. 13 within workflow designer GUI 316 after the user has set up a connection to bot framework 350 and also added a new step "Send to conversation" to the workflow.

As shown in FIG. 15, interactive object 1302 now includes the text "Connected to BotNew42." This text indicates that a connection to bot framework 150 has been established for the bot named "BotNew42." Interactive object 1302 also now includes an element 1502 that a user can interact with (e.g., click on) to change the connection.

As also shown in FIG. 15, the user has selected the second step of the workflow to be the step "send to conversation", which is represented by an interactive object 1504. This step is an action step that occurs in response to the trigger step being triggered. This action step can send provided text to a particular conversation. In this case, the user has specified the text to be provided to be "Would you like to receive a quote?"

In particular, as shown in FIG. 15, interactive object 1504 includes a plurality of data entry elements via which a user can specify or otherwise configure various input parameters of the "send to conversation" step. These data entry elements include a first data entry element 1506 via which a user can specify a Type of message to send, a second data entry element 1508 via which a user can specify a Service URL, a third data entry element 1510 via which a user can specify a Conversation ID, a fourth data entry element 1512 via which a user can specify the text of the message to be sent, and a fifth data entry element 1514 via which a user can specify a From ID for the message. These parameters were defined previously and thus shall not be described again for the sake of brevity.

Various user interface techniques may be used to permit a user to configure the input parameters of the "send to conversation" step. For example, a drop down menu may be used to select the Type from among a set of predefined activity types. Furthermore, various output parameters of the "when a bot receives a message" step may be represented as user-interactive objects (or "tokens") and when a user interacts with a particular user-interactive object, the corresponding output parameter may automatically be placed within a data entry element to indicate that the value of the corresponding output parameter should be used as the value of the input parameter associated with the data entry element.

Thus, for example, as shown in FIG. 15, the following outputs from the step "when a bot receives a message" are represented, collectively, as user-interactive objects 1516: Channel ID, Conversation ID, Conversation Name, From ID, From Name, Is Group Conversation, Locale, Recipient ID, Recipient Name, Reply to ID, Service URL, Summary, Text, Text Format, Topic Name and Type.

In FIG. 15, the user has interacted with some of the user-interactive objects to configure the value of some of the input parameters for the "send to conversation" step to be equal to the value of some of the output parameters of the step "when a bot receives a message." For example, the user has set the value of the input parameter Service URL to be equal to the value of the Service URL parameter output by the trigger step, the value of the input parameter Conversation ID to be equal to the value of the output parameter Conversation ID output by the trigger step, and the value of the input parameter From ID to be equal to the value of the Recipient ID output by the trigger step. More information concerning the manner in which the user is enabled to establish values for input parameters of workflow steps by clicking on graphical representations of output parameters of previous workflow steps is described in commonly-owned and co-pending U.S. patent application Ser. No. 15/188,407, entitled "Workflow Development System with Ease-of-Use Features" and filed on Jun. 21, 2016 (the entirety of which is incorporated by reference herein).

In an embodiment, the user-interactive objects or tokens may be shown below each data entry element that the user is currently interacting with to facilitate populating of the particular data entry element. Furthermore, user-interactive objects or tokens representing the outputs of two more previous workflow steps may be displayed simultaneously to the user such that the user can select from among the output parameters of multiple different workflow steps.

Figure 16:
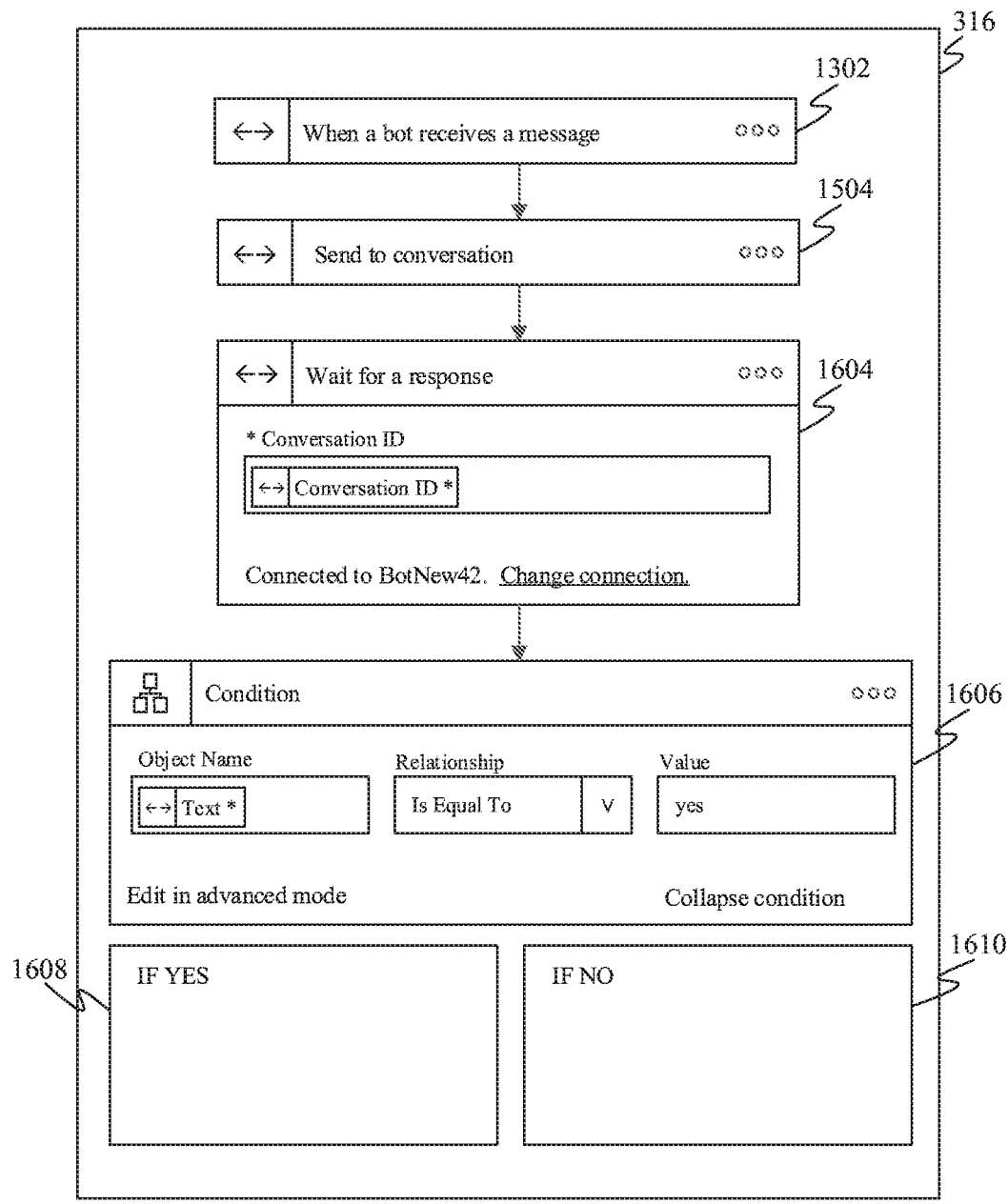
Figure 17:
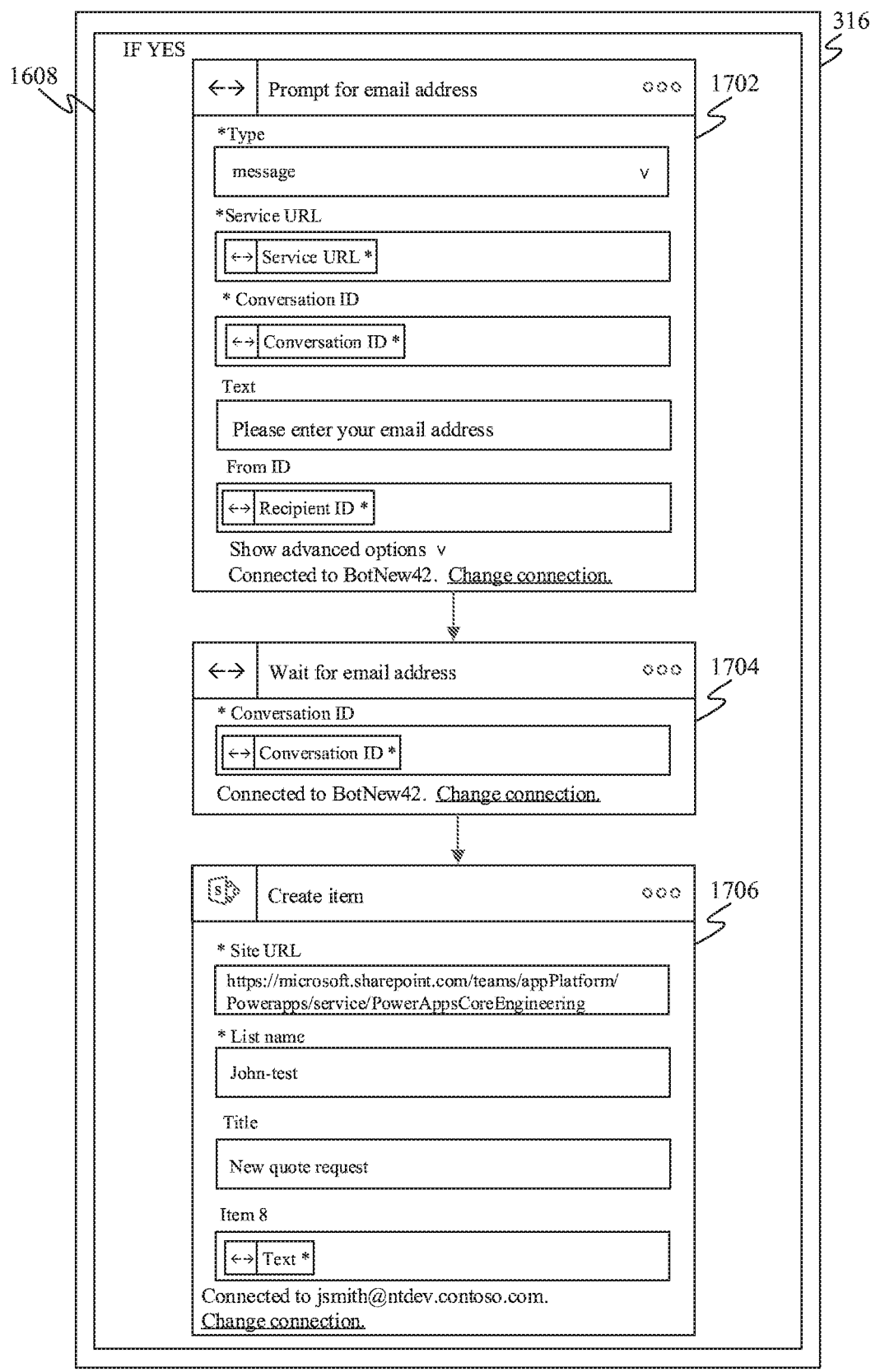
Figure 18:
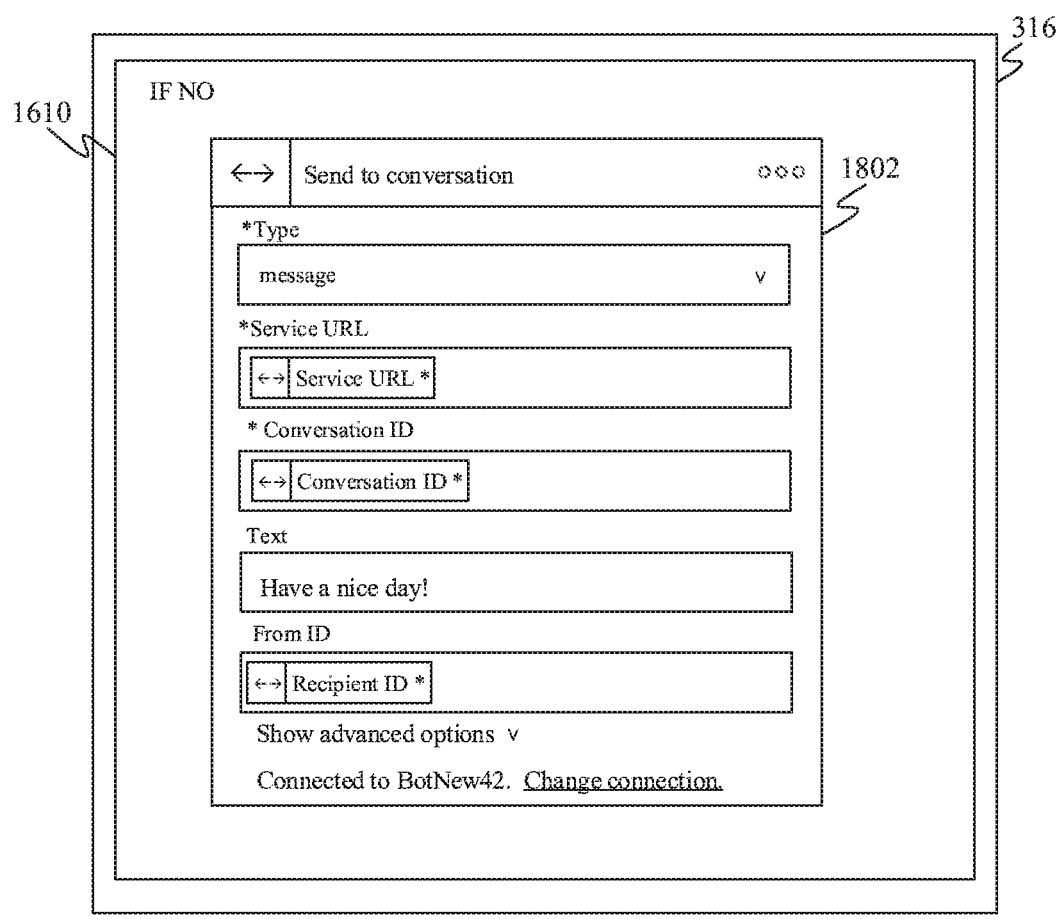

FIGS. 16-18 show the remaining steps of the example workflow as displayed within workflow designer GUI 316. As shown in FIG. 16, the user has selected the third step of the workflow to be the step "wait for a response," which is represented in workflow designer GUI 316 as interactive object 1604. This step is performed after the "send to conversation" step. This step waits on the conversation identified by the Conversation ID for an end user to send a reply. As further shown in this figure, the user has set the input parameter Conversation ID of this step to be the Conversation ID output by a previous step.

As also shown in FIG. 16, the user has selected the fourth step of the workflow to be a "Condition step," which is represented in workflow designer GUI 316 as interactive object 1606. This condition step takes one of two different sets of actions depending on the text that is returned from the user in the "Wait for response" step. In particular, a first set of actions 1608 is taken if the text is equal to "yes." Otherwise a second set of actions 1610 is taken. As can be seen in this figure, the user can use the condition step to test if any of a variety of different objects (e.g., output parameters of previous steps) bears any of a variety of different relationships (e.g., selected from a drop-down menu) to a particular user-specified value.

As shown in FIG. 17, the user has selected first set of actions 1608 to include a step "prompt for email address" (represented by interactive object 1702) that causes the user to be prompted for their email address by sending the text "Please enter your email address" to the conversation identified by the Conversation ID. This step is followed by a "wait for email address" step (represented by interactive object 1704) that waits for the user to provide the requested email address, which is followed by a "create item" step (represented by interactive object 1706) that adds the provided email address to the Sharepoint list "John-test."

As also shown in FIG. 18, the user has selected second set of actions 1610 to include a step "send to conversation" (represented by interactive object 1802) which sends the message "Have a nice day!" to the conversation identified by the Conversation ID.

In the foregoing example, both the "When a bot receives a message" trigger step and the "Wait for a response" action step have the same output parameters. With respect to input parameters, the "Send to conversation" action takes as input parameters the same data as the output parameters described above. In some scenarios, these fields are populated with the data from the outputs, and every channel has different requirements for which data must be provided.

In an embodiment, the "Wait for a response" action only needs the ID of the conversation that the flow should listen on. This may be populated with the Conversation ID output from the "When a bot receives a message" trigger step.

Thus, as can be seen from the foregoing, the user can utilize the workflow development system to easily develop a bot in the form of a workflow. Since the workflow development process merely involves selecting and configuring previously defined workflow steps, the user need not have specialized computer programming skills to develop the bot.

Furthermore, as can be seen from the foregoing, a set of predefined steps relating to bot interactions (e.g., "when a bot receives a message," "send to conversation," "wait for a response") are made available to the user for inclusion in the workflow. These steps can be used to implement a script for managing interaction between the bot and an end user. For example, these steps can be used to implement a conversational flow between the end user and the bot. Furthermore, these steps can also be combined with other workflow steps that are designed to interact with other applications (e.g., email applications, document management applications, database applications, social networking applications, financial services applications, news applications, search applications, productivity applications, cloud storage applications, file hosting applications, etc.) so that such other applications can be invoked to perform actions in response to certain interactions between the bot and an end user and also to obtain information that can be used to facilitate such interactions.

For example, using the above-described workflow development system, a user can easily create a workflow that includes a workflow step in which an application is invoked to perform any of the following actions in response to receiving a message directed to the bot: send an e-mail, send a push notification, copy or move a file, create or update an entry in a database or spreadsheet, save a document or file to a library, post content to a social network, add an event to a calendar, add a task to a to do list, obtain financial data, obtain news content, obtain a weather report, conduct an internet search, or the like. However, these are merely a few examples, and any of a wide variety of additional actions may be performed by an application that is invoked in response to receiving a message directed to the bot.

Furthermore, the bot implemented as a workflow can invoke an application to obtain information therefrom and then initiate or continue a conversation with an end user based on such obtained information. For example, using the above-described workflow development system, a user can easily create a workflow that includes a workflow step in which an application is invoked to obtain any of the following types of information, wherein such information can then be used as the basis of the sending of a message to an end user: stock information, weather information, news information, enterprise-related information, health-related information, or the like. For example, the bot implemented as workflow can be programmed to initiate a conversation with an end user when a severe weather warning is obtained from a weather application. However, these are merely a few examples, and any of a wide variety of information types may be obtained from other applications and used as the basis for sending one or more messages to an end user of the bot.

C. Example Methods of Bot Creation Using Workflow Development System

Figure 19:
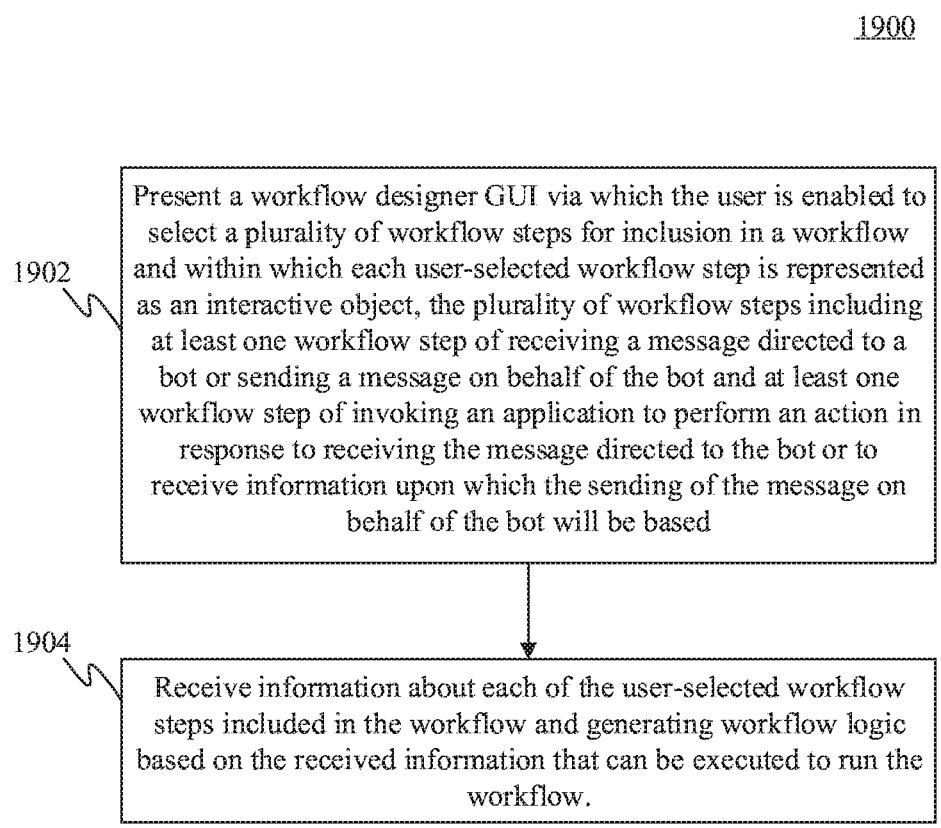
FIG. 19 depicts a flowchart of a method for using a workflow development system to develop a bot in accordance with an embodiment.

Some example methods of creating a bot using a workflow development system will now be described. For example, FIG. 19 depicts a flowchart 1900 of a method for using a workflow development system to develop a bot in accordance with an embodiment. The method of flowchart 1900 may be performed, for example, by workflow development system 300 as described above.

As shown in FIG. 19, the method of flowchart 1900 starts at step 1900, in which the workflow development system (e.g., workflow development system 300) presents a workflow designer GUI (e.g., workflow designer GUI 316) via which a user is enabled to select a plurality of workflow steps for inclusion in a workflow and within which each user-selected workflow step is represented as an interactive object. The plurality of workflow steps include at least one workflow step of receiving a message directed to a bot (e.g., "when a bot receives a message", "wait for a response") or sending a message on behalf of the bot (e.g., "send to conversation"). The plurality of workflow steps also include at least one workflow step of invoking an application to perform an action in response to receiving the message directed to the bot or to receive information upon which the sending of the message on behalf of the bot will be based.

At step 1904, the workflow development system receives information about each of the user-selected workflow steps included in the workflow and generates workflow logic (workflow logic 320) based on the received information that can be executed to run the workflow. For example, as discussed above, workflow logic generator 312 of workflow development system 300 may receive constructed workflow information 338 that indicates which workflow steps have been inserted into the workflow, any input parameter values associated therewith and a sequencing thereof. Workflow logic generator 312 also receives selected workflow logic 520, which is the workflow logic for each workflow step of the workflow as indicated in constructed workflow information 338. Workflow logic generator 312 generates workflow logic 320 for the workflow based on constructed workflow information 338 and selected workflow logic 520. Such workflow logic 320 is executable in a runtime environment to run the workflow.

In accordance with one embodiment of the foregoing method, the workflow designer GUI enables the user to specify connection information for the at least one workflow step of receiving the message directed to the bot or sending the message on behalf of the bot, the connection information comprising information for establishing a connection to a bot framework that receives and sends messages over one or more communication channels on behalf of the bot.

In accordance with another embodiment of the foregoing method, the plurality of steps further includes receiving an indication that an originator of a message directed to the bot is typing.

In accordance with a further embodiment of the foregoing method, the at least one workflow step of receiving a message directed to a bot comprises a trigger workflow step for initiating execution of the workflow.

In another embodiment, the at least one workflow step of invoking the application to perform the action in response to receiving the message directed to the bot comprises invoking the application to perform one of the following in response to receiving the message directed to the bot: sending an e-mail, sending a push notification, copying or moving a file, creating or update an entry in a database or spreadsheet, saving a document or file to a library, posting content to a social network, adding an event to a calendar, adding a task to a to do list, obtaining financial data, obtaining news content, obtaining a weather report, or conducting an internet search.

In accordance with a further embodiment of the foregoing method, the at least one workflow step of invoking the application to receive information upon which the sending of the message on behalf of the bot will be based comprises invoking the application to receive one or more of: stock information, weather information, news information, enterprise-related information, or health-related information stock information.

In accordance with another embodiment of the foregoing method, the workflow designer GUI is further configured to presents as tokens items of information associated with a particular message received by the bot as part of a first workflow step, and in response to selection of a token by a user, to cause the corresponding item of information to be used as an input parameter of a second workflow step. The items of information associated with the particular message received by the bot as part of the first workflow step may comprise one or more items of information appended to the particular message by a bot framework. Furthermore, the items of information associated with the particular message received by the bot as part of the first workflow step comprise one or more of: a channel identifier that identifies a channel over which the particular message was received, a conversation identifier that identifies a conversation of which the particular message is a part, an identifier of an originator of the particular message, an indicator that indicates whether or not the particular message is part of a private conversation or a group conversation, a locale associated with the particular message, a recipient identifier that identifies the bot that received the particular message, an identifier of the particular message to which a response can be directed, a service URL associated with a channel over which the particular message was received, text of the particular message, a format of the text of the particular message, or a type of action associated with the particular message.

Figure 20:
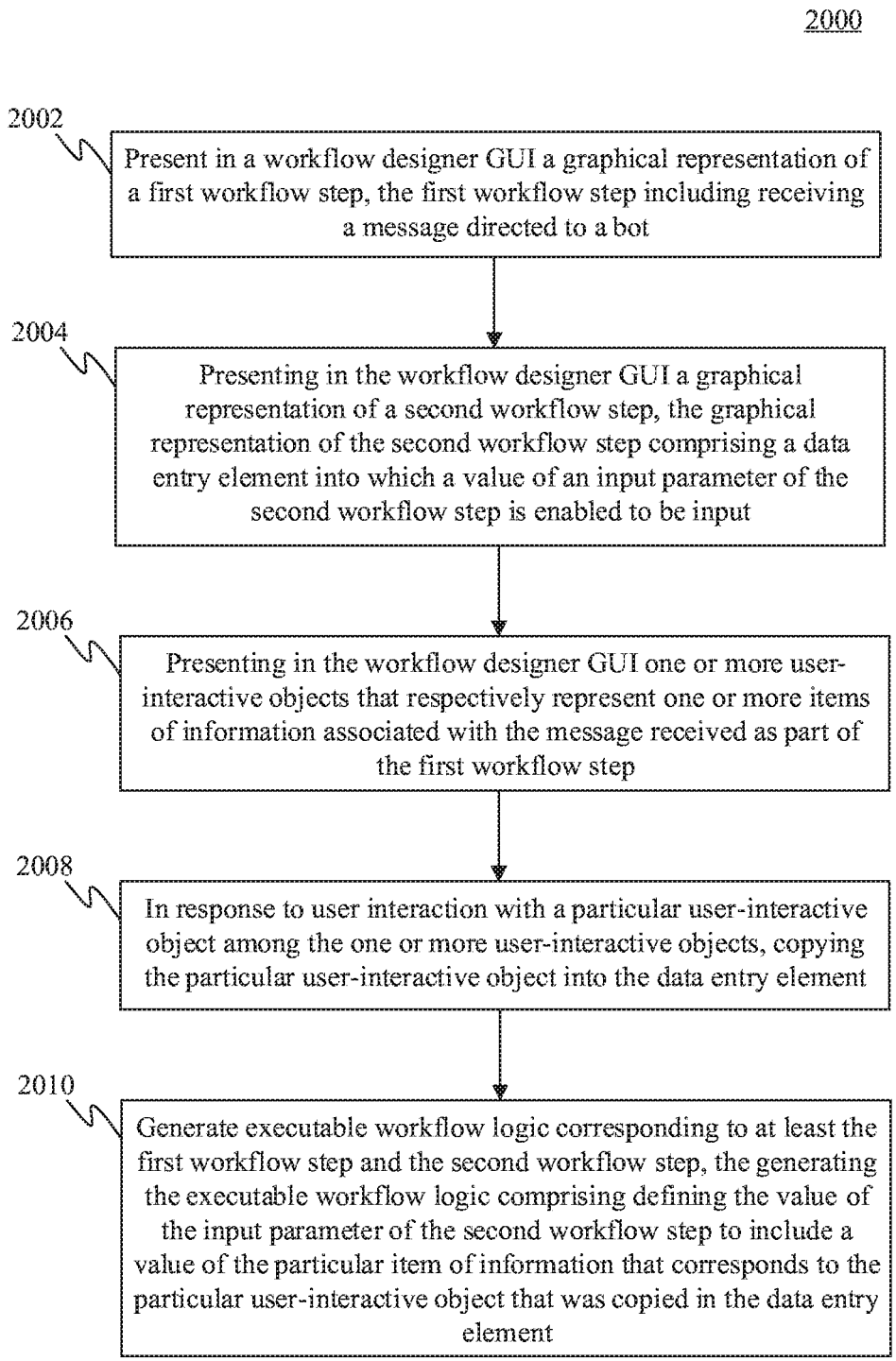
FIG. 20 depicts a flowchart of another method for using a workflow development system to develop a bot in accordance with an embodiment.

FIG. 20 depicts a flowchart 2000 of a method for using a workflow development system to develop a bot in accordance with an embodiment. The method of flowchart 2000 may be performed, for example, by workflow development system 300 as described above.

As shown in FIG. 20, the method of flowchart 2000 begins at step 2002, in which a graphical representation of a first workflow step is presented in a workflow designer GUI, the first workflow step including receiving a message directed to a bot. For example, as shown in FIG. 15, workflow designer 306 may cause a graphical representation 1302 of the first workflow step "when a bot receives a message" to be rendered within workflow designer GUI 316. In this example, "when a bot receives a message" comprises a trigger step that monitors to determine when a message has been received by the bot via bot framework 350.

At step 2004, a graphical representation of a second workflow step is presented in the workflow designer GUI. For example, as shown in FIG. 15, workflow designer 306 may cause a graphical representation 1504 of the second workflow step "send to conversation" to be rendered within workflow designer GUI 316. In this example, "send to conversation" comprises an action step that is carried out when a trigger event is detected by trigger step "when a bot receives a message."

In further accordance with step 2004, the graphical representation of the second workflow step comprises a data entry element into which a user is enabled to input a value of an input parameter of the second workflow step. This is further illustrated in FIG. 15, in which graphical representation 1504 of second workflow step "send to conversation" includes a first data entry element 1506, a second data entry element 1508, a third data entry element 1510, a fourth data entry element 1512 and a fifth data entry element 1514. The developer may interact with each of these data entry elements to specify a value of a corresponding input parameter of the second workflow step.

In step 2006, one or more user-interactive objects are presented in the workflow designer GUI that respectively represent one or more items of information associated with the message received as part of the first workflow step. For example, as shown in FIG. 15, workflow designer 306 causes user-interactive objects 1516 to be presented within graphical representation 1504 of the workflow step "send to conversation" displayed within workflow designer GUI 316. Each of these user-interactive objects respectively represent an item of information associated with a message received as part of the first workflow step "when a bot receives a message."

In the example shown in FIG. 15, the developer may interact with each of these user-interactive objects to cause the corresponding user-interactive object to be copied into, e.g., fifth data entry element 1514. For example, depending upon the implementation, the developer may simply click on a user-interactive object using a mouse, touch a user-interactive object via a touch screen, or the like. As another example, the developer may drag and drop a particular user-interactive object into fifth data entry element 1514. Still other forms of user-interaction may be performed that will cause a user-interactive object to be copied into fifth data entry element 1514.

This functionality is represented in step 2008 of flowchart 2000. In particular, at step 2008, in response to user interaction with a particular user-interactive object from among the one or more user-interactive objects, the particular user-interactive object is copied into the data entry element. Thus, for example, as shown in FIG. 15, in response to the developer interacting with the user-interactive object "Recipient ID" in FIG. 15, a copy thereof has been included in fifth data entry element 1514.

The effect of the copying of the user-interactive object "Recipient ID" into fifth data entry element 1514 is that, at runtime, the "From ID" input parameter of the second workflow step "Send to conversation" will be defined to include the current value of the "file name" output parameter of the first workflow step "When a bot receives a message."

This functionality is achieved by workflow designer 306 in accordance with step 2010 of flowchart 2000. In step 2010, executable workflow logic is generated corresponding to at least the first workflow step and the second workflow step, wherein the generating the executable workflow logic comprises defining the value of the input parameter of the second workflow to include a value of a particular output parameter of the first workflow step that corresponds to the particular user-interactive object that was copied into the data entry element. Thus, in further accordance with the foregoing example, workflow designer 306 generates executable workflow logic (e.g., via workflow logic generator 312 as previously described) that corresponds to at least the first workflow step "when a bot receives a message" and the second workflow step "send to conversation", wherein generating such logic includes defining the value of the "From ID" input parameter of the second workflow step "send to conversation" to include the value of the "Recipient ID" output parameter of the first workflow step "when a bot receives a message" that corresponds to the user-interactive object labelled "Recipient ID" that was copied into fifth data entry element 1514.

III. Example Mobile and Stationary Device Embodiments

The systems described above, including the systems for executing bots described in reference to FIGS. 1 and 2, and the workflow development system described in reference to FIGS. 3-20, may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 21:
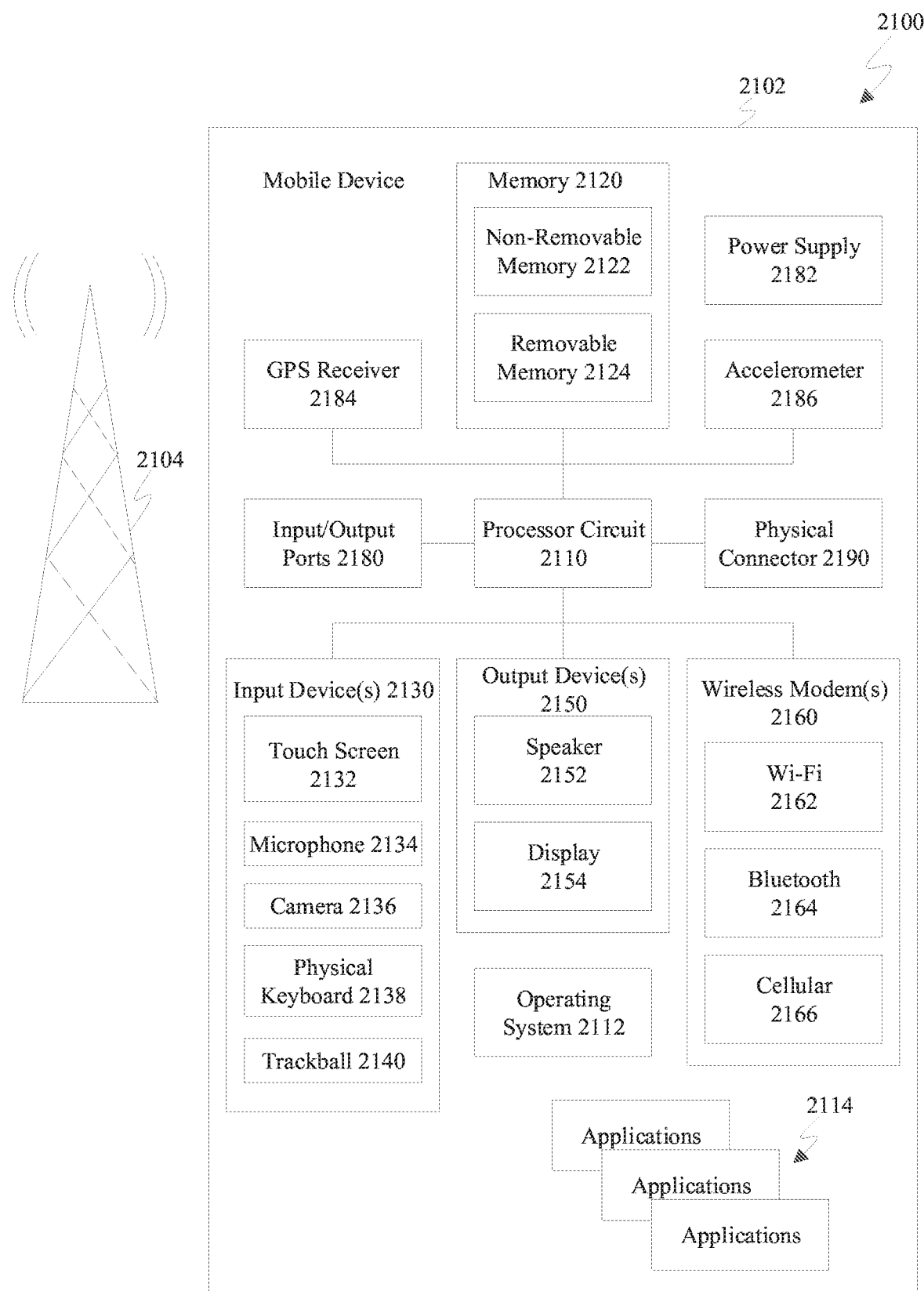
FIG. 21 is a block diagram of an exemplary user device in which embodiments may be implemented.

FIG. 21 shows a block diagram of an exemplary mobile device 2100 including a variety of optional hardware and software components, shown generally as components 2102. Any number and combination of the features/elements of components 2102 may be included in a mobile device embodiment, as well as additional and/or alternative features/elements, as would be known to persons skilled in the relevant art(s). It is noted that any of components 2102 can communicate with any other of components 2102, although not all connections are shown, for ease of illustration. Mobile device 2100 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 2104, such as a cellular or satellite network, or with a local area or wide area network.

The illustrated mobile device 2100 can include a controller or processor referred to as processor circuit 2110 for performing such tasks as signal coding, image processing, data processing, input/output processing, power control, and/or other functions. Processor circuit 2110 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2110 may execute program code stored in a computer readable medium, such as program code of one or more applications 2114, operating system 2112, any program code stored in memory 2120, etc. Operating system 2112 can control the allocation and usage of the components 2102 and support for one or more application programs 2114 (a.k.a. applications, "apps", etc.). Application programs 2114 can include common mobile computing applications (e.g., email applications, calendars, contact managers, web browsers, messaging applications) and any other computing applications (e.g., word processing applications, mapping applications, media player applications).

As illustrated, mobile device 2100 can include memory 2120. Memory 2120 can include non-removable memory 2122 and/or removable memory 2124. The non-removable memory 2122 can include RAM, ROM, flash memory, a hard disk, or other well-known memory storage technologies. The removable memory 2124 can include flash memory or a Subscriber Identity Module (SIM) card, which is well known in GSM communication systems, or other well-known memory storage technologies, such as "smart cards." The memory 2120 can be used for storing data and/or code for running the operating system 2112 and the applications 2114. Example data can include web pages, text, images, sound files, video data, or other data sets to be sent to and/or received from one or more network servers or other devices via one or more wired or wireless networks. Memory 2120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 2120. These programs include operating system 2112, one or more application programs 2114, and other program modules and program data. Examples of such application programs or program modules may include, for example, computer program logic (e.g., computer program code or instructions) for implementing the systems described above, including the systems for executing bots described in reference to FIGS. 1 and 2, and the workflow development system described in reference to FIGS. 3-20.

Mobile device 2100 can support one or more input devices 2130, such as a touch screen 2132, microphone 2134, camera 2136, physical keyboard 2138 and/or trackball 2140 and one or more output devices 2150, such as a speaker 2152 and a display 2154.

Other possible output devices (not shown) can include piezoelectric or other haptic output devices. Some devices can serve more than one input/output function. For example, touch screen 2132 and display 2154 can be combined in a single input/output device. The input devices 2130 can include a Natural User Interface (NUI).

Wireless modem(s) 2160 can be coupled to antenna(s) (not shown) and can support two-way communications between processor circuit 2110 and external devices, as is well understood in the art. The modem(s) 2160 are shown generically and can include a cellular modem 2166 for communicating with the mobile communication network 2104 and/or other radio-based modems (e.g., Bluetooth 2164 and/or Wi-Fi 2162). Cellular modem 2166 may be configured to enable phone calls (and optionally transmit data) according to any suitable communication standard or technology, such as GSM, 3G, 4G, 5G, etc. At least one of the wireless modem(s) 2160 is typically configured for communication with one or more cellular networks, such as a GSM network for data and voice communications within a single cellular network, between cellular networks, or between the mobile device and a public switched telephone network (PSTN).

Mobile device 2100 can further include at least one input/output port 2180, a power supply 2182, a satellite navigation system receiver 2184, such as a Global Positioning System (GPS) receiver, an accelerometer 2186, and/or a physical connector 2190, which can be a USB port, IEEE 2394 (FireWire) port, and/or RS-232 port. The illustrated components 2102 are not required or all-inclusive, as any components can be not present and other components can be additionally present as would be recognized by one skilled in the art.

Figure 22:
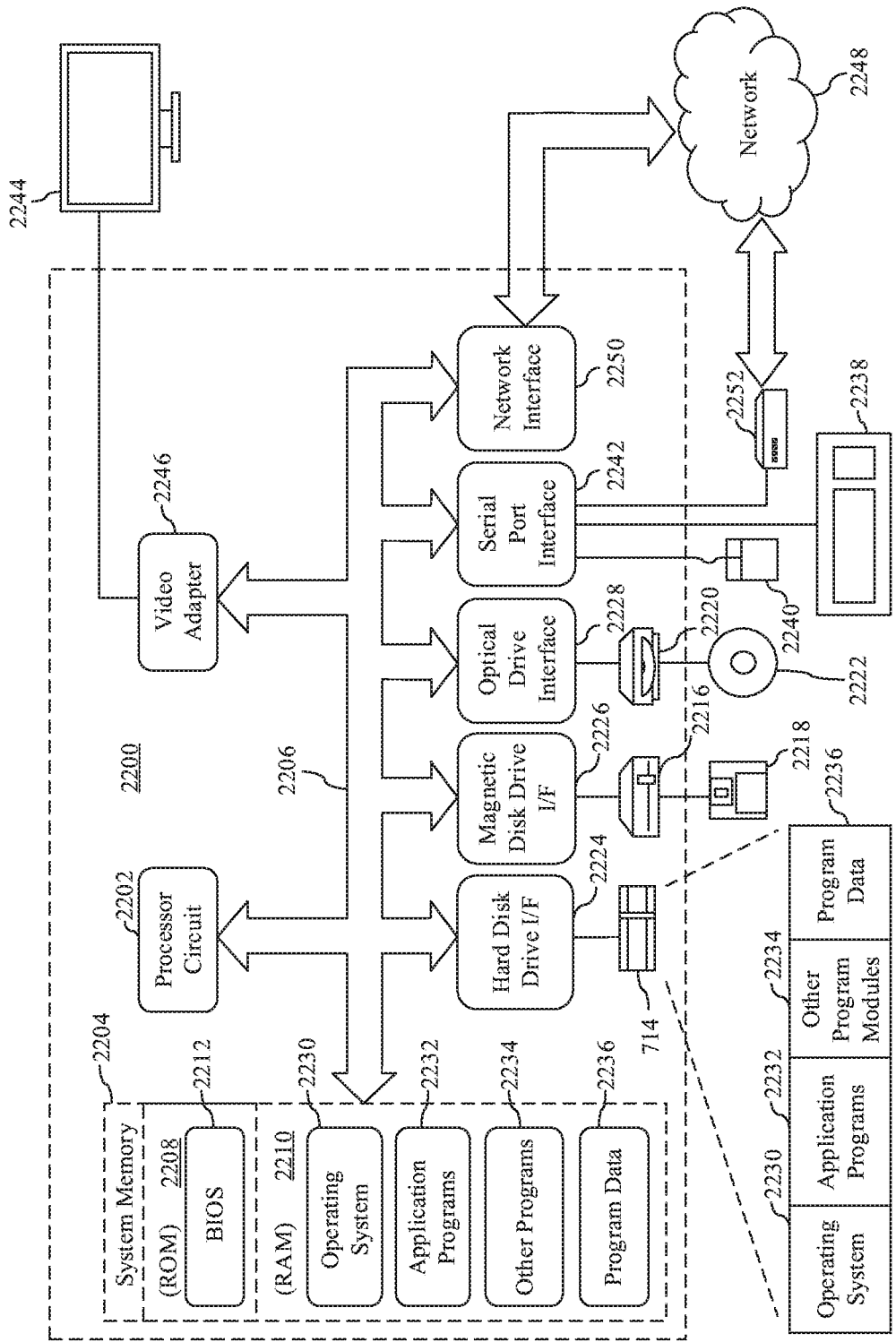
FIG. 22 is a block diagram of an example computing device that may be used to implement embodiments.

Furthermore, FIG. 22 depicts an exemplary implementation of a computing device 2200 in which embodiments may be implemented. The description of computing device 2200 provided herein is provided for purposes of illustration, and is not intended to be limiting. Embodiments may be implemented in further types of computer systems, as would be known to persons skilled in the relevant art(s).

As shown in FIG. 22, computing device 2200 includes one or more processors, referred to as processor circuit 2202, a system memory 2204, and a bus 2206 that couples various system components including system memory 2204 to processor circuit 2202. Processor circuit 2202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2202 may execute program code stored in a computer readable medium, such as program code of operating system 2230, application programs 2232, other programs 2234, etc. Bus 2206 represents one or more of any of several types of bus structures, including a memory bus or memory controller, a peripheral bus, an accelerated graphics port, and a processor or local bus using any of a variety of bus architectures. System memory 2204 includes read only memory (ROM) 2208 and random access memory (RAM) 2210. A basic input/output system 2212 (BIOS) is stored in ROM 2208.

Computing device 2200 also has one or more of the following drives: a hard disk drive 2214 for reading from and writing to a hard disk, a magnetic disk drive 2216 for reading from or writing to a removable magnetic disk 2218, and an optical disk drive 2220 for reading from or writing to a removable optical disk 2222 such as a CD ROM, DVD ROM, or other optical media. Hard disk drive 2214, magnetic disk drive 2216, and optical disk drive 2220 are connected to bus 2206 by a hard disk drive interface 2224, a magnetic disk drive interface 2226, and an optical drive interface 2228, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 2230, one or more application programs 2232, other programs 2234, and program data 2236. Application programs 2232 or other programs 2234 may include, for example, computer program logic (e.g., computer program code or instructions) for implementing the systems described above, including the systems for executing bots described in reference to FIGS. 1 and 2, and the workflow development system described in reference to FIGS. 3-20.

A user may enter commands and information into the computing device 2200 through input devices such as keyboard 2238 and pointing device 2240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 2202 through a serial port interface 2242 that is coupled to bus 2206, but may be connected by other interfaces, such as a parallel port, game port, or a universal serial bus (USB).

A display screen 2244 is also connected to bus 2206 via an interface, such as a video adapter 2246. Display screen 2244 may be external to, or incorporated in computing device 2200. Display screen 2244 may display information, as well as being a user interface for receiving user commands and/or other information (e.g., by touch, finger gestures, virtual keyboard, etc.). In addition to display screen 2244, computing device 2200 may include other peripheral output devices (not shown) such as speakers and printers.

Computing device 2200 is connected to a network 2248 (e.g., the Internet) through an adaptor or network interface 2250, a modem 2252, or other means for establishing communications over the network. Modem 2252, which may be internal or external, may be connected to bus 2206 via serial port interface 2242, as shown in FIG. 22, or may be connected to bus 2206 using another interface type, including a parallel interface.

As used herein, the terms "computer program medium," "computer-readable medium," and "computer-readable storage medium" are used to generally refer to physical hardware media such as the hard disk associated with hard disk drive 2214, removable magnetic disk 2218, removable optical disk 2222, other physical hardware media such as RAMs, ROMs, flash memory cards, digital video disks, zip disks, MEMs, nanotechnology-based storage devices, and further types of physical/tangible hardware storage media (including system memory 2204 of FIG. 22). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 2232 and other programs 2234) may be stored on the hard disk, magnetic disk, optical disk, ROM, RAM, or other hardware storage medium. Such computer programs may also be received via network interface 2250, serial port interface 2252, or any other interface type. Such computer programs, when executed or loaded by an application, enable computing device 2200 to implement features of embodiments discussed herein. Accordingly, such computer programs represent controllers of the computing device 2200.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A system is described herein. The system includes at least one processor circuit and at least one memory that stores program code configured to be executed by the at least one processor circuit. The program code comprises a GUI generator configured to generate a workflow designer GUI that enables a user to select a plurality of workflow steps for inclusion in a workflow and within which each user-selected workflow step is represented as an interactive object, The plurality of workflow steps includes at least one workflow step of receiving a message directed to a bot or sending a message on behalf of the bot and at least one workflow step of invoking an application to perform an action in response to receiving the message directed to the bot or to obtain information upon which the sending of the message on behalf of the bot will be based. The program code further comprises a workflow logic generator configured to receive constructed workflow information that indicates each of the user-selected workflow steps included in the workflow, any input parameter values associated therewith, and a sequencing thereof. The workflow logic generator is further configured to generate workflow logic based on the received constructed workflow information, the workflow logic being executable in a runtime environment to run the workflow.

In one embodiment of the foregoing system, the workflow designer GUI enables the user to specify connection information for the at least one workflow step of receiving the message directed to the bot or sending the message on behalf of the bot, the connection information comprising information for establishing a connection to a bot framework that receives and sends messages over one or more communication channels on behalf of the bot.

In another embodiment of the foregoing system, the bot comprises a software program that is configured to simulate intelligent conversation with one or more end users via auditory or textual methods.

In yet another embodiment of the foregoing system, the at least one workflow step of receiving a message directed to a bot comprises a trigger workflow step for initiating execution of the workflow.

In still another embodiment of the foregoing system, the at least one workflow step of invoking the application to perform the action in response to receiving the message directed to the bot comprises invoking the application to perform one of the following in response to receiving the message directed to the bot: sending an e-mail; sending a push notification; copying or moving a file; creating or update an entry in a database or spreadsheet; saving a document or file to a library; posting content to a social network; adding an event to a calendar; adding a task to a to do list; obtaining financial data; obtaining news content; obtaining a weather report; or conducting an internet search.

In another embodiment of the foregoing system, the at least one workflow step of invoking the application to receive information upon which the sending of the message on behalf of the bot will be based comprises invoking the application to receive one or more of: stock information; weather information; news information; enterprise-related information; or health-related information stock information.

In yet another embodiment of the foregoing system, the workflow designer GUI is further configured to presents as tokens items of information associated with a particular message received by the bot as part of a first workflow step, and in response to selection of a token by a user, to cause the corresponding item of information to be used as an input parameter of a second workflow step. In accordance with such an embodiment, the items of information associated with the particular message received by the bot as part of the first workflow step may comprise one or more items of information appended to the particular message by a bot framework. In further accordance with such an embodiment, the items of information associated with the particular message received by the bot as part of the first workflow step comprise one or more of: a channel identifier that identifies a channel over which the particular message was received; a conversation identifier that identifies a conversation of which the particular message is a part; an identifier of an originator of the particular message; an indicator that indicates whether or not the particular message is part of a private conversation or a group conversation; a locale associated with the particular message; a recipient identifier that identifies the bot that received the particular message; an identifier of the particular message to which a response can be directed; a service Uniform Resource Locator (URL) associated with a channel over which the particular message was received; text of the particular message; a format of the text of the particular message; or a type of action associated with the particular message.

A method performed by a computer-implemented workflow development system for enabling a user to develop a bot is also described herein. The method includes: providing a workflow designer graphical user interface (GUI) via which the user is enabled to select a plurality of workflow steps for inclusion in a workflow and within which each user-selected workflow step is represented as an interactive object, the plurality of workflow steps including at least one workflow step of receiving a message directed to a bot or sending a message on behalf of the bot and at least one workflow step of invoking an application to perform an action in response to receiving the message directed to the bot or to receive information upon which the sending of the message on behalf of the bot will be based; receiving constructed workflow information that indicates each of the user-selected workflow steps included in the workflow, any input parameter values associated therewith, and a sequencing thereof; and generating workflow logic based on the received constructed workflow information, the workflow logic being executable in a runtime environment to run the workflow.

In one embodiment of the foregoing method, providing the workflow designer GUI further comprises providing a GUI by which the user is enabled to specify connection information for the at least one workflow step of receiving the message directed to the bot or sending the message on behalf of the bot, the connection information comprising information for establishing a connection to a bot framework that receives and sends messages over one or more communication channels on behalf of the bot.

In another embodiment of the foregoing method, the plurality of workflow steps further includes receiving an indication that an originator of a message directed to the bot is typing.

In yet another embodiment of the foregoing method, the at least one workflow step of receiving a message directed to a bot comprises a trigger workflow step for initiating execution of the workflow.

In still another embodiment of the foregoing method, the at least one workflow step of invoking the application to perform the action in response to receiving the message directed to the bot comprises invoking the application to perform one of the following in response to receiving the message directed to the bot: sending an e-mail; sending a push notification; copying or moving a file; creating or update an entry in a database or spreadsheet; saving a document or file to a library; posting content to a social network; adding an event to a calendar; adding a task to a to do list; obtaining financial data; obtaining news content; obtaining a weather report; or conducting an internet search.

In a further embodiment of the foregoing method, the at least one workflow step of invoking the application to receive information upon which the sending of the message on behalf of the bot will be based comprises invoking the application to receive one or more of: stock information; weather information; news information; enterprise-related information; or health-related information stock information.

In a still further embodiment of the foregoing method, providing the workflow designer GUI further comprises providing a GUI in which items of information associated with a particular message received by the bot as part of a first workflow step are represented as tokens; and in response to selection of one of the tokens by a user, causing the corresponding item of information to be used as an input parameter of a second workflow step. In accordance with such an embodiment, the items of information associated with the particular message received by the bot may comprise one or more of: a channel identifier that identifies a channel over which the particular message was received; a conversation identifier that identifies a conversation of which the particular message is a part; an identifier of an originator of the particular message; an indicator that indicates whether or not the particular message is part of a private conversation or a group conversation; a locale associated with the particular message; a recipient identifier that identifies the bot that received the particular message; an identifier of the particular message to which a response can be directed; a service Uniform Resource Locator (URL) associated with a channel over which the particular message was received; text of the particular message; a format of the text of the particular message; and a type of action associated with the particular message.

A computer program product is also described herein. The computer program product comprises a computer-readable memory having computer program logic recorded thereon that when executed by at least one processor causes the at least one processor to perform a method, the method comprising: presenting in a workflow designer GUI a graphical representation of a first workflow step, the first workflow step including receiving a message directed to a bot; presenting in the workflow designer GUI a graphical representation of a second workflow step, the graphical representation of the second workflow step comprising a data entry element into which a value of an input parameter of the second workflow step is enabled to be input; presenting in the workflow designer GUI one or more user-interactive objects that respectively represent one or more items of information associated with the message received as part of the first workflow step; in response to user interaction with a particular user-interactive object among the one or more user-interactive objects, copying the particular user-interactive object into the data entry element; and generating executable workflow logic corresponding to at least the first workflow step and the second workflow step, the generating the executable workflow logic comprising defining the value of the input parameter of the second workflow step to include a value of the particular item of information that corresponds to the particular user-interactive object that was copied into the data entry element.

In one embodiment of the foregoing computer program product, the one or more items of information associated with the message received as part of the first workflow step comprise one or more items of information appended to the message by a bot framework.

In another embodiment of the foregoing computer program product, the one or more items of information associated with the message received as part of the workflow step comprise one or more of: a channel identifier that identifies a channel over which the message was received; a conversation identifier that identifies a conversation of which the message is a part; an identifier of an originator of the message; an indicator that indicates whether or not the message is part of a private conversation or a group conversation; a locale associated with the message; a recipient identifier that identifies the bot that received the message; an identifier of the message to which a response can be directed; a service Uniform Resource Locator (URL) associated with a channel over which the message was received; text of the message; a format of the text of the message; and a type of action associated with the message.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
at least one processor circuit; and
at least one memory that stores program code configured to be executed by the at least one processor circuit, the program code comprising:
a workflow logic generator configured to:
receive constructed workflow information that indicates a plurality of workflow steps for inclusion in a workflow and a sequencing thereof, the plurality of workflow steps including:
at least one workflow step of receiving a message directed to a bot or sending a message on behalf of the bot, the bot comprising a software program that is configured to simulate intelligent conversation with one or more end users, and
at least one workflow step of invoking an application to perform an action in response to receiving the message directed to the bot or to obtain information upon which the sending of the message on behalf of the bot will be based;
in response to at least an interaction with an interactive object to initiate a process for setting a connection to a bot framework, receive connection information for the at least one workflow step of receiving the message directed to the bot or sending the message on behalf of the bot, the connection information being received as an input to one or more data entry elements of a workflow designer and comprising information for establishing the connection to the bot framework that receives and sends messages over one or more communication channels on behalf of the bot; and
generate workflow logic based on the received constructed workflow information, the workflow logic being executable in a runtime environment to run the workflow.

2. The system of claim 1, wherein the software program is configured to simulate intelligent conversation with the one or more end users via auditory or textual methods.

3. The system of claim 1, wherein the at least one workflow step of receiving the message directed to the bot comprises a trigger workflow step for initiating execution of the workflow.

4. The system of claim 1, wherein the at least one workflow step of invoking the application to perform the action in response to receiving the message directed to the bot comprises:
invoking the application to perform one of the following in response to receiving the message directed to the bot:
sending an e-mail;
sending a push notification;
copying or moving a file;
creating or update an entry in a database or spreadsheet;
saving a document or file to a library;
posting content to a social network;
adding an event to a calendar;
adding a task to a to do list;
obtaining financial data;
obtaining news content;
obtaining a weather report; or
conducting an internet search.

5. The system of claim 1, wherein the at least one workflow step of invoking the application to obtain information upon which the sending of the message on behalf of the bot will be based comprises:
invoking the application to obtain one or more of:
stock information;
weather information;
news information;
enterprise-related information; or
health-related information.

6. The system of claim 1, wherein the workflow logic generator is further configured to receive a selection of one or more tokens representing one or more items of information associated with a particular message received by the bot as part of a first workflow step, and
in response to the selection, cause the corresponding item of information to be used as an input parameter of the second workflow step.

7. The system of claim 6, wherein the items of information associated with the particular message received by the bot as part of the first workflow step comprise one or more items of information appended to the particular message by a bot framework.

8. The system of claim 6, wherein the items of information associated with the particular message received by the bot as part of the first workflow step comprise one or more of:
a channel identifier that identifies a channel over which the particular message was received;
a conversation identifier that identifies a conversation of which the particular message is a part;
an identifier of an originator of the particular message;
an indicator that indicates whether or not the particular message is part of a private conversation or a group conversation;
a locale associated with the particular message;
a recipient identifier that identifies the bot that received the particular message;
an identifier of the particular message to which a response can be directed;
a service Uniform Resource Locator (URL) associated with a channel over which the particular message was received;
text of the particular message;
a format of the text of the particular message; or
a type of action associated with the particular message.

9. The system of claim 1, further comprising a workflow execution engine configured to execute the workflow logic in the runtime environment.

10. A method performed by a computer-implemented workflow development system for generating workflow logic, comprising:
receiving constructed workflow information that indicates a plurality of workflow steps for inclusion in a workflow and a sequencing thereof, the plurality of workflow steps including:
at least one workflow step of receiving a message directed to a bot or sending a message on behalf of the bot, the bot comprising a software program that is configured to simulate intelligent conversation with one or more end users; and
at least one workflow step of invoking an application to perform an action in response to receiving the message directed to the bot or to receive information upon which the sending of the message on behalf of the bot will be based;
in response to at least an interaction with an interactive object to initiate a process for setting a connection to a bot framework, receiving connection information for the at least one workflow step of receiving the message directed to the bot or sending the message on behalf of the bot, the connection information being received as an input to one or more data entry elements of a workflow designer and comprising information for establishing the connection to the bot framework that receives and sends messages over one or more communication channels on behalf of the bot; and generating workflow logic based on the received constructed workflow information, the workflow logic being executable in a runtime environment to run the workflow.

11. The method of claim 10, wherein the plurality of workflow steps further includes:

receiving an indication that an originator of a message directed to the bot is typing.

12. The method of claim 10, wherein the at least one workflow step of receiving the message directed to the bot comprises a trigger workflow step for initiating execution of the workflow.

13. The method of claim 10, wherein the at least one workflow step of invoking the application to perform the action in response to receiving the message directed to the bot comprises:

invoking the application to perform one of the following in response to receiving the message directed to the bot:
sending an e-mail;
sending a push notification;
copying or moving a file;
creating or update an entry in a database or spreadsheet;
saving a document or file to a library;
posting content to a social network;
adding an event to a calendar;
adding a task to a to do list;
obtaining financial data;
obtaining news content;
obtaining a weather report; or
conducting an internet search.

14. The method of claim 10, wherein the at least one workflow step of invoking the application to receive information upon which the sending of the message on behalf of the bot will be based comprises:

invoking the application to receive one or more of:
stock information;
weather information;
news information;
enterprise-related information; or
health-related information.

15. The method of claim 10, further comprising:
receiving a selection of one or more tokens representing one or more items of information associated with a particular message received by the bot as part of a first workflow step; and
in response to the selection, causing the corresponding item of information to be used as an input parameter of the second workflow step.

16. A computer program product comprising a computer-readable memory having computer program logic recorded thereon that when executed by at least one processor causes the at least one processor to perform a method, the method comprising:

receiving in a workflow logic generator information corresponding to a first workflow step and a second workflow step, the first workflow step including receiving a message directed to a bot and the second workflow step comprising a data entry element into which a value of an input parameter of the second workflow step is enabled to be input;

in response to at least an interaction with an interactive object to initiate a process for setting a connection to a bot framework, receiving connection information for the first workflow step, the connection information being received as an input to one or more data entry elements of a workflow designer and comprising information for establishing the connection to the bot framework that receives messages over one or more communication channels directed to the bot;

receiving a selection of one or more objects that respectively represent one or more items of information associated with the message received as part of the first workflow step;

in response to the selection of a particular object among the one or more objects, copying the particular object into the data entry element; and generating executable workflow logic corresponding to at least the first workflow step and the second workflow step, the generating the executable workflow logic comprising defining the value of the input parameter of the second workflow step to include a value of the particular item of information that corresponds to the particular object that was copied into the data entry element.

17. The computer program product of claim 16, wherein the first workflow step of receiving the message directed to the bot comprises a trigger workflow step for initiating execution of the workflow.

18. The computer program product of claim 16, wherein the second workflow step comprises at least one workflow step of invoking an application to perform an action in response to receiving the message directed to the bot, the at least one workflow step of invoking the application to perform the action in response to receiving the message directed to the bot comprising:

invoking the application to perform one of the following in response to receiving the message directed to the bot:
sending an e-mail;
sending a push notification;
copying or moving a file;
creating or update an entry in a database or spreadsheet;
saving a document or file to a library;
posting content to a social network;
adding an event to a calendar;
adding a task to a to do list;
obtaining financial data;
obtaining news content;
obtaining a weather report; or
conducting an internet search.

19. The computer program product of claim 16, wherein the one or more items of information associated with the message received as part of the first workflow step comprise one or more items of information appended to the message by a bot framework.

20. The computer program product of claim 16, wherein the one or more items of information associated with the message received as part of the workflow step comprise one or more of:

a channel identifier that identifies a channel over which the message was received;
a conversation identifier that identifies a conversation of which the message is a part;
an identifier of an originator of the message;
an indicator that indicates whether or not the message is part of a private conversation or a group conversation;

a locale associated with the message;
a recipient identifier that identifies the bot that received the message;
an identifier of the message to which a response can be directed;
a service Uniform Resource Locator (URL) associated with a channel over which the message was received;
text of the message;
a format of the text of the message; and
a type of action associated with the message.

* * * * *